US010106253B2

(12) United States Patent
Groninga et al.

(10) Patent No.: US 10,106,253 B2
(45) Date of Patent: Oct. 23, 2018

(54) TILTING DUCTED FAN AIRCRAFT GENERATING A PITCH CONTROL MOMENT

(71) Applicant: Bell Helicopter Textron Inc., Fort Worth, TX (US)

(72) Inventors: Kirk Landon Groninga, Forth Worth, TX (US); Daniel Bryan Robertson, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 209 days.

(21) Appl. No.: 15/252,916

(22) Filed: Aug. 31, 2016

(65) Prior Publication Data

US 2018/0057157 A1   Mar. 1, 2018

(51) Int. Cl.
*B64C 27/82* (2006.01)
*B64C 29/00* (2006.01)
*B64C 27/28* (2006.01)
*B64C 27/52* (2006.01)
*B64C 39/00* (2006.01)

(52) U.S. Cl.
CPC ............. *B64C 27/82* (2013.01); *B64C 27/28* (2013.01); *B64C 27/52* (2013.01); *B64C 29/0033* (2013.01); *B64C 39/008* (2013.01); *B64C 2027/8245* (2013.01); *B64C 2027/8254* (2013.01)

(58) Field of Classification Search
CPC ....... B64C 11/001; B64C 21/00; B64C 27/82; B64C 27/00; B64C 29/00; B64C 29/0033; B64C 2027/8254; B64C 2027/8245; B64C 2027/8236; B64C 2027/8218
See application file for complete search history.

(56) References Cited

U.S. PATENT DOCUMENTS

| 1,487,228 | A | 3/1924 | Emilio |
| 3,212,735 | A | 10/1965 | Nikolaus |
| 5,100,080 | A | 3/1992 | Servanty |

(Continued)

FOREIGN PATENT DOCUMENTS

| CN | 204674831 U | 9/2015 |
| CN | 104276284 B | 4/2016 |

(Continued)

OTHER PUBLICATIONS

European Examination Report, Application No. 17163296.1, EPO, dated Dec. 5, 2017.

(Continued)

*Primary Examiner* — Timothy D Collins
*Assistant Examiner* — Tye William Abell
(74) *Attorney, Agent, or Firm* — Lawrence Youst PLLC

(57) ABSTRACT

In some embodiments, an aircraft includes a fuselage having a forward portion and an aft portion. First and second ducted fans are supported by the forward portion of the fuselage. The first and second ducted fans are tiltable relative to the fuselage between a generally horizontal orientation, in a vertical takeoff and landing mode, and a generally vertical orientation, in a forward flight mode. A tailboom having an aft station extends from the aft portion of the fuselage. A cross-flow fan is disposed in the aft station of the tailboom and is operable to generate a pitch control moment.

19 Claims, 17 Drawing Sheets

(56) References Cited

U.S. PATENT DOCUMENTS

| | | | |
|---|---|---|---|
| 5,205,512 A * | 4/1993 | Rumberger | B64C 27/82 244/17.19 |
| 6,007,021 A * | 12/1999 | Tsepenyuk | B64C 39/008 244/19 |
| 7,518,864 B2 * | 4/2009 | Kimura | F04D 17/04 165/104.33 |
| 7,594,625 B2 | 9/2009 | Robertson et al. | |
| 7,641,144 B2 | 1/2010 | Kummer et al. | |
| 7,731,121 B2 | 6/2010 | Smith et al. | |
| 7,931,233 B2 | 4/2011 | Arafat et al. | |
| 8,469,308 B2 | 6/2013 | Robertson et al. | |
| 8,596,570 B1 * | 12/2013 | Carambat | B64C 11/006 244/12.1 |
| 8,636,243 B2 | 1/2014 | Robertson | |
| 8,727,265 B2 | 5/2014 | Altmikus et al. | |
| 9,260,185 B2 | 2/2016 | Covington et al. | |
| 9,409,643 B2 | 8/2016 | Mores et al. | |
| 9,452,832 B2 | 9/2016 | Heid | |
| 2006/0249621 A1 | 11/2006 | Stephens | |
| 2007/0200029 A1 | 8/2007 | Sullivan | |
| 2012/0091257 A1 * | 4/2012 | Wolff | B64C 29/0033 244/12.4 |
| 2012/0111994 A1 | 5/2012 | Kummer et al. | |
| 2012/0256042 A1 * | 10/2012 | Altmikus | B64C 27/82 244/17.21 |
| 2012/0312916 A1 | 12/2012 | Groninga | |
| 2013/0026303 A1 * | 1/2013 | Wang | B64C 3/54 244/7 R |
| 2013/0119186 A1 * | 5/2013 | Heid | B64C 27/82 244/17.21 |
| 2015/0191245 A1 * | 7/2015 | Mores | B64C 27/06 244/17.19 |
| 2015/0197335 A1 | 7/2015 | Dekel et al. | |
| 2015/0314865 A1 * | 11/2015 | Bermond | B64C 29/0033 244/17.27 |
| 2016/0214710 A1 * | 7/2016 | Brody | B64C 29/0033 |
| 2017/0003690 A1 * | 1/2017 | Tanahashi | G05D 1/0011 |
| 2017/0152935 A1 * | 6/2017 | Filter | B64C 29/0025 |

FOREIGN PATENT DOCUMENTS

| | | |
|---|---|---|
| EP | 2511177 A1 | 10/2012 |
| EP | 2808253 A1 | 12/2014 |
| FR | 2375090 A1 | 7/1978 |
| GB | 885663 A | 12/1961 |
| GB | 2316374 A | 2/1998 |
| JP | 2009051381 A | 3/2009 |

OTHER PUBLICATIONS

European Search Report, Application No. 16188806.0, European Patent Office, dated Aug. 8, 2017.
European Search Report, Application No. 17163296.1, EPO, dated Oct. 16, 2017.

* cited by examiner

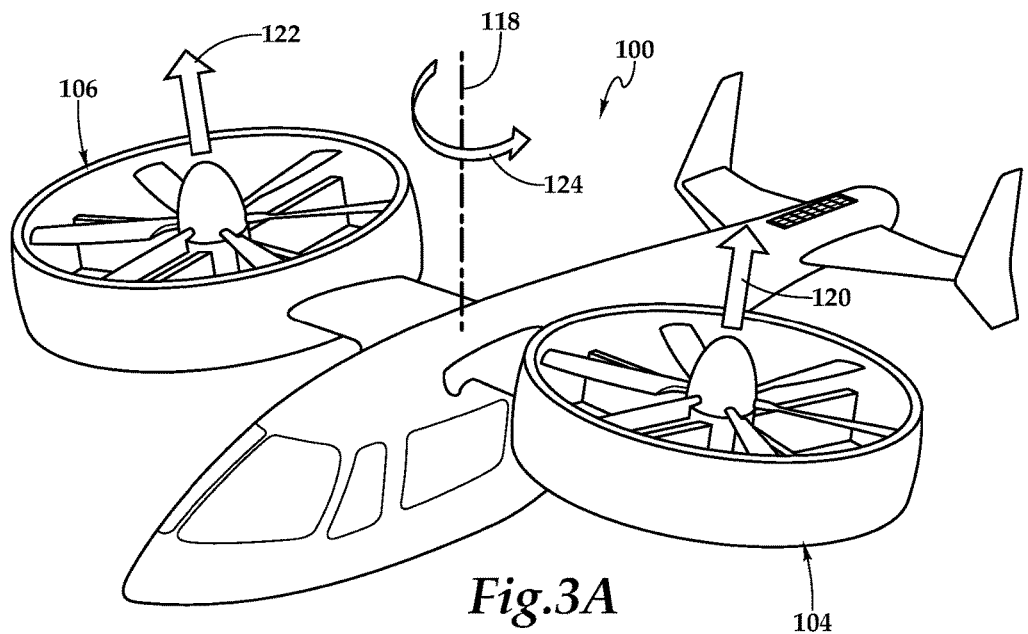
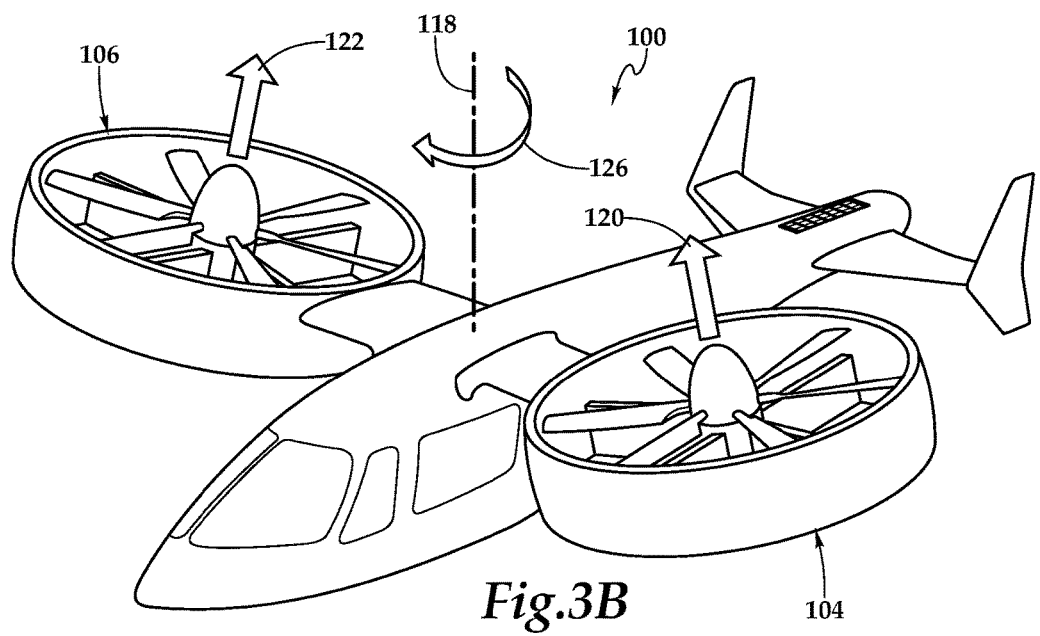

TILTING DUCTED FAN AIRCRAFT GENERATING A PITCH CONTROL MOMENT

TECHNICAL FIELD OF THE DISCLOSURE

The present disclosure relates, in general, to aircraft operable to transition between a forward flight mode and a vertical takeoff and landing mode and, in particular, to tilting ducted fan aircraft having a variable thrust cross-flow fan mounted in an aft station of the tailboom and operable to generate a pitch control moment.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, utilize openly exposed proprotors, which may present a number of drawbacks. For example, openly exposed proprotors can lead to blade tip thrust losses during flight, thrust vectoring capabilities are limited and use of pressure differentials to augment thrust is limited.

SUMMARY

In a first aspect, the present disclosure is directed to an aircraft including a fuselage having a forward portion and an aft portion. First and second ducted fans are supported by the forward portion of the fuselage. The first and second ducted fans are tiltable relative to the fuselage between a generally horizontal orientation, in a vertical takeoff and landing mode, and a generally vertical orientation, in a forward flight mode. A tailboom having an aft station extends from the aft portion the fuselage. A cross-flow fan is disposed in the aft station of the tailboom and is operable to generate a pitch control moment.

In some embodiments, the pitch control moment may be a pitch control thrust, such as a variable pitch control thrust or a reversible pitch control thrust, generated by the cross-flow fan. In certain embodiments, the pitch control moment may be operable to maintain the aircraft in a substantially horizontal attitude during fight maneuvers such as hover, vertical takeoff, vertical landing and transitions therebetween. In vertical takeoff and landing mode, yaw may be controllable responsive to thrust vectoring the first and second ducted fans and/or roll may be controllable responsive to independently adjusting collective pitch of the first and second ducted fans. In forward flight mode, yaw may be controllable responsive to independently adjusting collective pitch of the first and second ducted fans.

In some embodiments, the cross-flow fan may be a variable thrust cross-flow fan that may include a cross-flow fan assembly having a longitudinal axis and including first and second driver plates having a plurality of blades rotatably mounted therebetween. The blades may be disposed radially outwardly from the longitudinal axis such that the blades have a generally circular path of travel when the cross-flow fan assembly rotates about the longitudinal axis. The plurality of blades may be moveable between a plurality of pitch angle configurations. A control assembly coupled to the plurality of blades is operable to change the pitch angle configuration of the plurality of blades to generate variable thrust. In such embodiments, the plurality of pitch angle configurations may include at least one upward thrust configuration, a neutral configuration and at least one downward thrust configuration. Also, in such embodiments, the control assembly may include a control cam that is operable to translate relative to the cross-flow fan assembly to change the pitch angle configuration of the plurality of blades. The control cam may be rotatable or non-rotatable relative to the cross-flow fan assembly.

In a second aspect, the present disclosure is directed to an aircraft including a fuselage having a forward portion and an aft portion. First and second ducted fans are supported by the forward portion of the fuselage. The first and second ducted fans are tiltable relative to the fuselage between a generally horizontal orientation, in a vertical takeoff and landing mode, and a generally vertical orientation, in a forward flight mode. A tailboom having first and second aft stations extends from the aft portion the fuselage. A first cross-flow fan is disposed in the first aft station of the tailboom and is operable to generate a pitch control moment. A second cross-flow fan is disposed in the second aft station of the tailboom and is operable to generate a yaw control moment.

In some embodiments, the first aft station is aft of the second aft station. In certain embodiments, the pitch control moment may be a reversible pitch control thrust generated by the first cross-flow fan and/or the yaw control moment may be a reversible yaw control thrust generated by the second cross-flow fan. In certain embodiments, the cross-flow fans may be variable thrust cross-flow fans.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIGS. 2, 3A, 3B and 4 are various isometric views of a tilting ducted fan aircraft utilizing ducted fans and a variable thrust cross-flow fan system to exert moments upon various axes in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
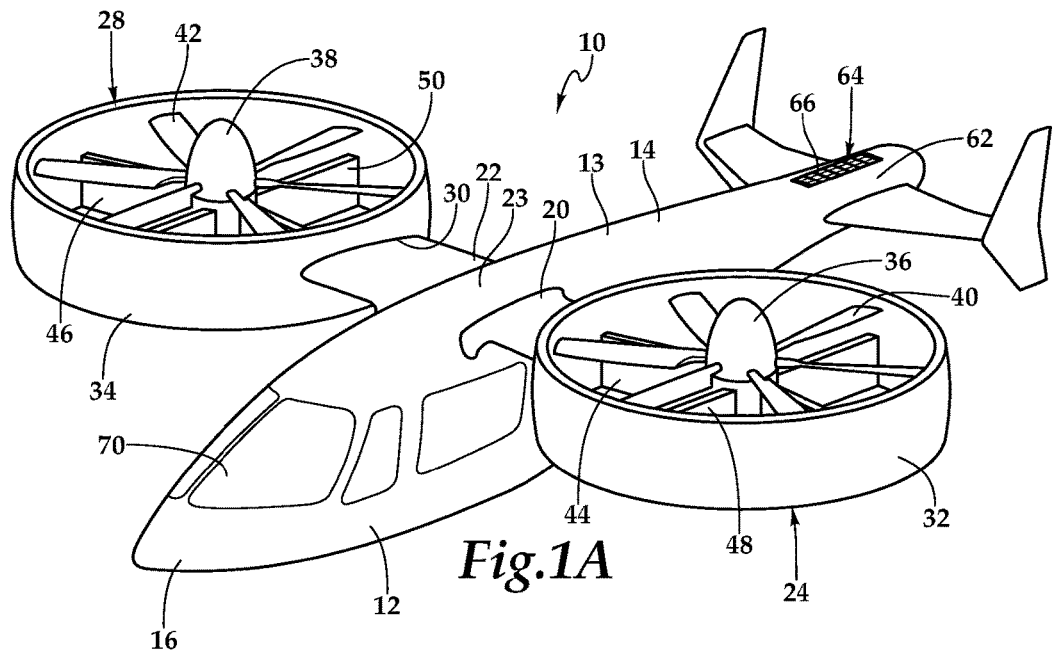
FIGS. 1A-1C are schematic illustrations of a tilting ducted fan aircraft utilizing ducted fans and a variable thrust cross-flow fan system in accordance with embodiments of the present disclosure.
Figure 1C:
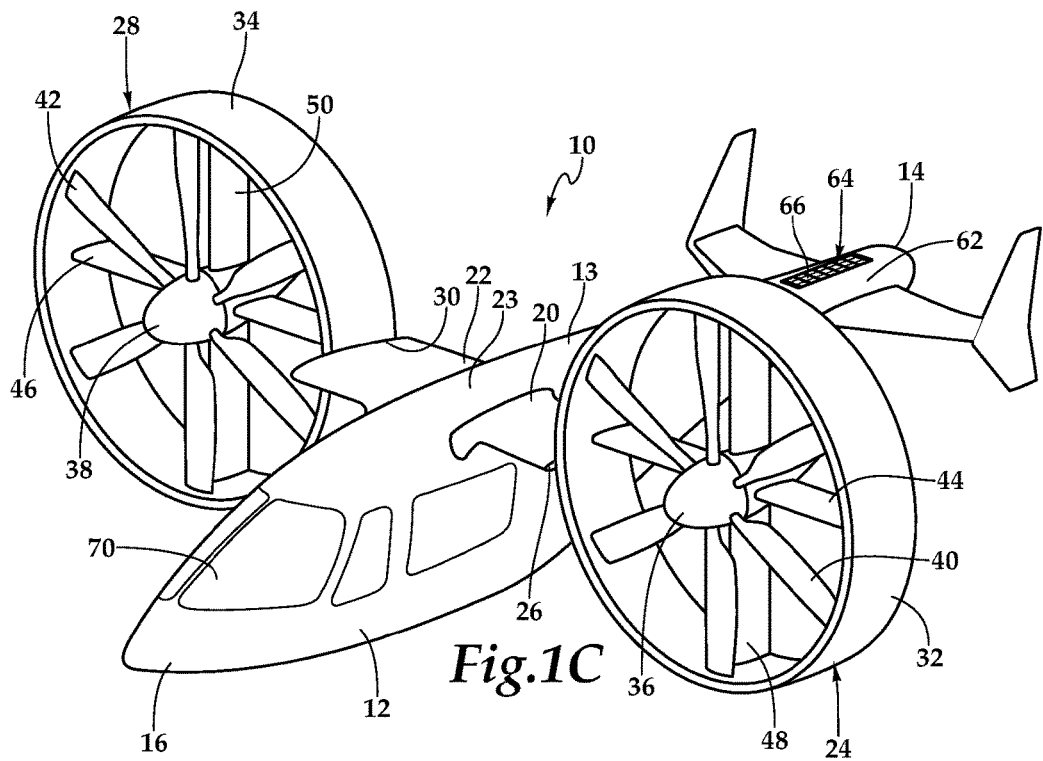
Figure 1B:
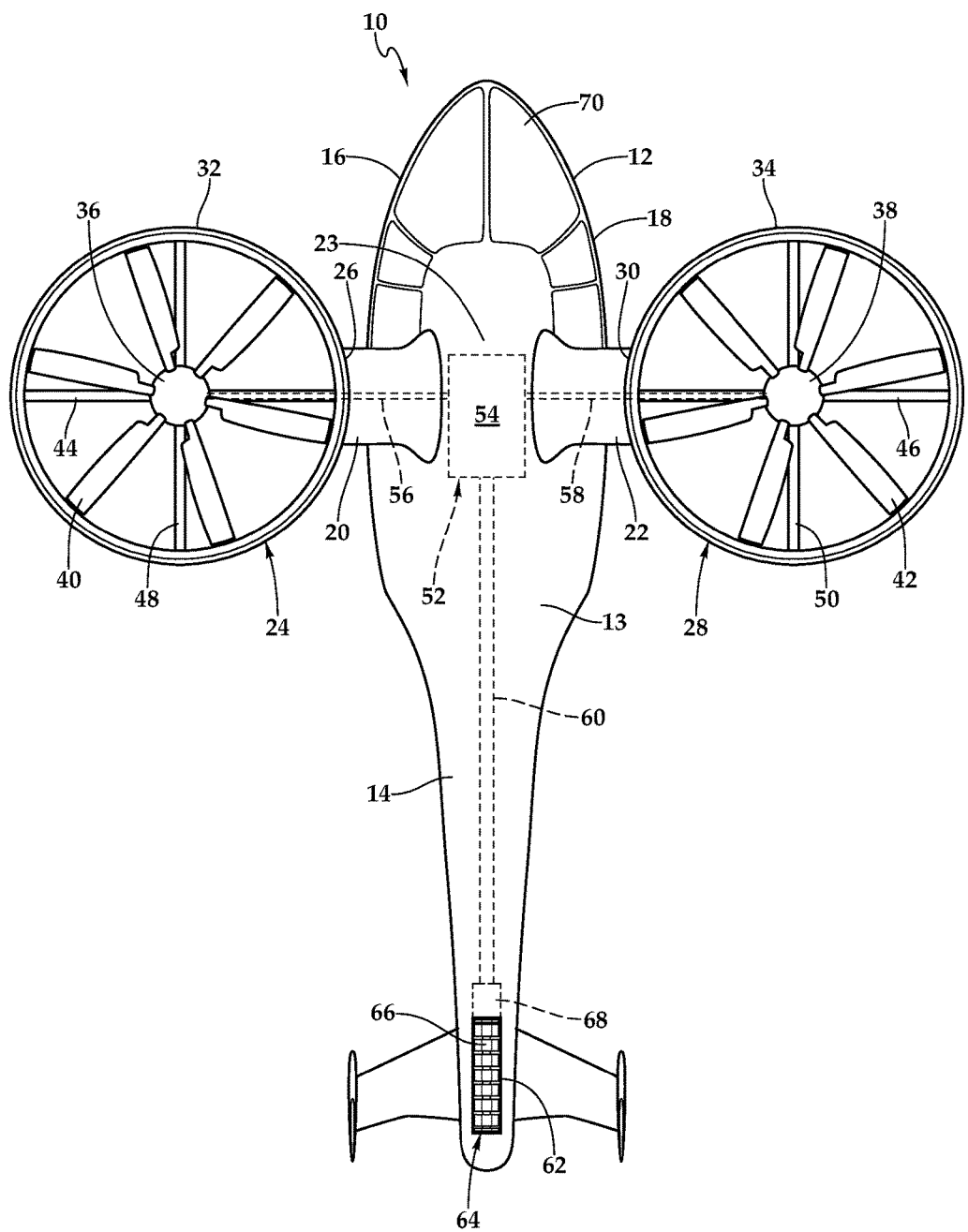

Referring to FIGS. 1A-1C in the drawings, a tilting ducted fan aircraft is schematically illustrated and generally designated 10. Aircraft 10 includes a fuselage 12. Fuselage 12 has an aft portion 13 from which a tailboom 14 extends in the aft direction. Aircraft 10 has a left side 16 and a right side 18. As used herein, the terms "left" and "right," unless otherwise indicated, refer to the port and starboard sides of the aircraft, respectively. Aircraft 10 includes a wing 20 and a wing 22, each of which extends from a forward portion 23 of fuselage 12. A ducted fan 24 is rotatably coupled to a distal end 26 of wing 20. Likewise, a ducted fan 28 is rotatably coupled to a distal end 30 of wing 22. Ducted fans 24, 28 are supported by forward portion 23 of fuselage 12. As used herein, the term "coupled" may include direct or indirect coupling by any means, including moving and non-moving mechanical connections. Each ducted fan 24, 28 includes a duct 32, 34 that surrounds, or partially encloses, rotor hub assemblies 36, 38 from which a plurality of blade assemblies 40, 42 radially extend, respectively. Blade assemblies 40, 42 can be collectively manipulated to selectively control direction, thrust and lift of aircraft 10. Indeed, the collective pitch of blade assemblies 40, 42 may be independently controlled from one another to allow for different thrusts by each ducted fan 24, 28. For example, the collective pitch of blade assemblies 40 of ducted fan 24 may be higher or lower than the collective pitch of blade assemblies 42 of ducted fan 28 such that the thrusts generated by each ducted fan 24, 28 differ from one another.

Each ducted fan 24, 28 also includes a horizontal support 44, 46 and a vertical support 48, 50, which may provide structural support, among other things, to ducted fans 24, 28, respectively. Aircraft 10 also includes a drive system 52, which includes engine and transmission 54 and drive shafts 56, 58, 60. Engine and transmission 54 is located in fuselage 12 of aircraft 10. In some embodiments, engine and transmission 54 provide torque and rotational energy to drive shafts 56, 58 that rotate rotor hub assemblies 36, 38, respectively. In other embodiments, each ducted fan 24, 28 may include a nacelle (not shown), each of which may house an engine to provide torque and rotational energy to rotor hub assemblies 36, 38.

Ducts 32, 34 may provide protection for the components of ducted fans 24, 28, including rotor hub assemblies 36, 38 and blade assemblies 40, 42. Ducts 32, 34 may also provide lift, or thrust, augmentation due to the pressure differential provided by the duct structure during flight. In some embodiments, ducts 32, 34 may also act as a wing surface to provide additional lift during forward flight mode. For example, all or a portion of the circumference of each of ducts 32, 34 may have an airfoil shape. In some embodiments, rotor hub assemblies 36, 38 may rotate in opposite directions from one another for torque balancing of aircraft 10.

Ducted fans 24, 28 are each tiltable, relative to fuselage 12, between a horizontal position, as shown in FIGS. 1A and 1B, and a vertical position, as shown in FIG. 1C. Ducted fans 24, 28 are in the horizontal position during vertical takeoff and landing mode. Vertical takeoff and landing mode may be considered to include hover operations of aircraft 10. Ducted fans 24, 28 are in the vertical position during forward flight mode of aircraft 10. In forward flight mode, ducted fans 24, 28 direct their respective thrusts in the aft direction to propel aircraft 10 forward. Aircraft 10 is operable to fly in all directions during the vertical takeoff and landing mode configuration of FIGS. 1A and 1B, although faster forward flight is achievable while in the forward flight mode configuration of FIG. 1C. Ducted fans 24, 28 may be tiltable between the vertical and horizontal positions by a rotatable shaft (not shown) extending through wings 20, 22, and which are rotatable in response to commands originating from a pilot or from elsewhere.

Aft station 62 of tailboom 14 includes a variable thrust cross-flow fan system 64 that is operable to generate variable thrust to provide a moment about an axis of aircraft 10. In particular, variable thrust cross-flow fan system 64 generates a reversible thrust that is selectively directable in the upward or downward direction to control a pitch of aircraft 10. In some embodiments, variable thrust cross-flow fan system 64 provides pitch control thrust for aircraft 10 during vertical takeoff and landing mode. Variable thrust generated by variable thrust cross-flow fan system 64 may also be used to maintain a substantially horizontal attitude of aircraft 10 while ducted fans 24, 28 tilt from the horizontal position of FIGS. 1A and 1B to the vertical position of FIG. 1C, or vice versa.

Variable thrust cross-flow fan system 64 is mounted along the longitudinal axis of tailboom 14 to generate a pitch control moment, in some embodiments. Variable thrust cross-flow fan system 64 may provide a multidirectional, including bidirectional, and variable intensity pitch control thrust to provide pitch control for aircraft 10. Variable thrust cross-flow fan system 64 is rotatable around a central longitudinal axis by drive system 52. Engine and transmission 54 provide torque and rotational energy to driveshaft 60. Driveshaft 60 may be a single long shaft or a series of shorter shafts and may preferably have flexible couplings to allow flexure. Driveshaft 60 mechanically couples to variable thrust cross-flow fan system 64. It should be noted that since engine 54 preferably operates at a constant rotational speed or velocity during flight operations, the gearing in transmission 54 is used to adjust the engine output to an optimal rotational speed for variable thrust cross-flow fan system 64. In other embodiments, a generator (not shown) may be mechanically coupled to engine 54. The generator may power a motor (not shown) that is operable to rotate drive shaft 60 and variable thrust cross-flow fan system 64 at a substantially constant rotational speed. In other embodiments, variable thrust cross-flow fan system 64 may be operated or rotated with a hydraulic motor.

Variable thrust cross-flow fan system 64 has a plurality of blades 66 that are rotated responsive to the rotation of driveshaft 60. Blades 66 of variable thrust cross-flow fan system 64 may rotate at a constant speed proportional to that of rotor hub assemblies 36, 38 based upon the gear ratios of transmission 54. Rotating blades 66 of variable thrust cross-flow fan system 64 at a constant speed is advantageous, as this eliminates additional systems and the associated complications necessary to enable variable speed rotation. Variable thrust cross-flow fan system 64 allows for pitch control without the detrimental amount of drag caused by previous pitch control mechanisms or propulsion systems.

Variable thrust cross-flow fan system 64 produces a variable and reversible pitch control thrust, including thrusts in the upward or downward directions, by changing the pitch, or angles of attack, of blades 66 of variable thrust cross-flow fan system 64 responsive to commands from an actuator assembly 68. Actuator assembly 68 may receive input from a pilot in a cockpit 70 or from another source to operate variable thrust cross-flow fan system 64 to control the pitch of aircraft 10, including, but not limited to, compensating for the torque on fuselage 12 caused by tilting ducted fans 24, 28 between the horizontal and vertical positions. Actuator assembly 68 may move parts of variable thrust cross-flow fan system 64 in a number of ways, including via mechanical actuation, hydraulic actuation or electronic actuation in a fly-by-wire environment. In some embodiments, both the airflow and thrust produced by variable thrust cross-flow fan system 64 is substantially perpendicular to driveshaft 60, and therefore in a substantially lateral direction relative to aircraft 10. Also, while the illustrated embodiment shows variable thrust cross-flow fan system 64, in other embodiments variable thrust cross-flow fan system 64 may include a cross-flow fan that lacks variable thrust capability.

Other aircraft implementations that can use variable thrust cross-flow fan system 64 include tiltrotor aircraft, hybrid aircraft, unmanned aircraft, gyrocopters and a variety of helicopter configurations, to name a few examples. The illustrative embodiments may also be used on airplanes. It should be appreciated that even though aircraft are particularly well suited to implement the embodiments of the present disclosure, non-aircraft vehicles and devices can also implement the embodiments.

Figure 2:
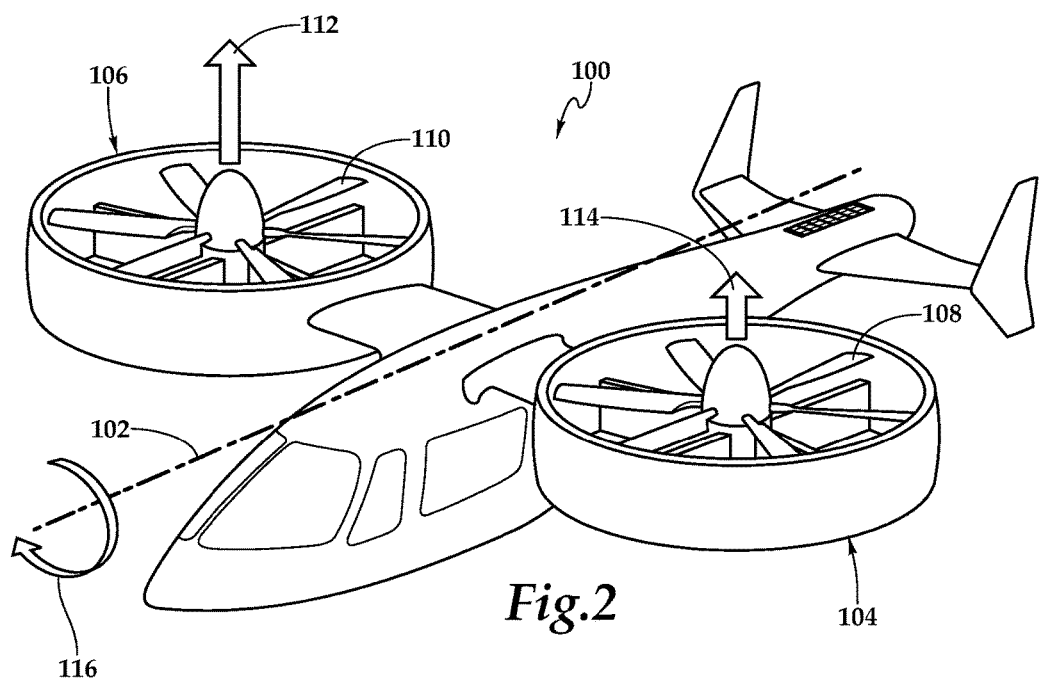

Referring to FIGS. 2, 3A, 3B and 4 in the drawings, a tilting ducted fan aircraft exerting moments upon various axes is schematically illustrated and generally designated 100. Referring specifically to FIG. 2, aircraft 100 is shown exerting a moment about axis 102 to control the roll of aircraft 100 while ducted fans 104, 106 are in the horizontal position during vertical takeoff and landing mode. The respective collective pitches of blade assemblies 108, 110 may be independently varied or adjusted so that the thrust output of each of ducted fans 104, 106 may be different from one another. By varying the thrusts of ducted fans 104, 106 from one another by independently controlling the collective pitches of blade assemblies 108, 110, a moment is produced about axis 102, which may be used to control roll and stabilize aircraft 100. As illustrated in FIG. 2, the collective pitch of blade assemblies 110 is greater than the collective pitch of blade assemblies 108 such that the thrust 112 generated by ducted fan 106 is greater than the thrust 114 generated by ducted fan 104. The result is that a moment is produced about axis 102 in the direction indicated by arrow 116. Conversely, a moment about axis 102 may be generated in a direction opposite from arrow 116 by setting the collective pitch of blade assemblies 108 to be greater than the collective pitch of blade assemblies 110 such that ducted fan 104 generates a greater thrust than ducted fan 106.

Referring to FIGS. 3A and 3B, a moment is produced about axis 118 of aircraft 100 to control the yaw of aircraft 100 during vertical takeoff and landing mode. The yaw of aircraft 100 may be controlled in response to thrust vectoring ducted fans 104, 106. In particular, the directions of the respective thrusts produced by ducted fans 104, 106 are offset from one another to produce a moment about axis 118. Referring specifically to FIG. 3A, ducted fan 104 is tilted backward so that thrust vector 120 generated thereby is in an aft biased direction and ducted fan 106 is tilted forward so that thrust vector 122 generated thereby is in a forward biased direction such that a moment is produced around axis 118 in a direction indicated by arrow 124. Referring now to FIG. 3B, ducted fan 104 is tilted forward so that thrust vector 120 generated thereby is in the forward biased direction and ducted fan 106 is tilted backward so that thrust vector 122 generated thereby is in the aft biased direction such that a moment is produced about axis 118 in the direction indicated by arrow 126. By producing moments about axis 118 in this manner, the yaw of aircraft 100 may be controlled. The degree to which thrust vectors 120, 122 may be offset from one another may range narrowly or widely depending upon the degree of moment, or torque, needed about axis 118.

Figure 4:
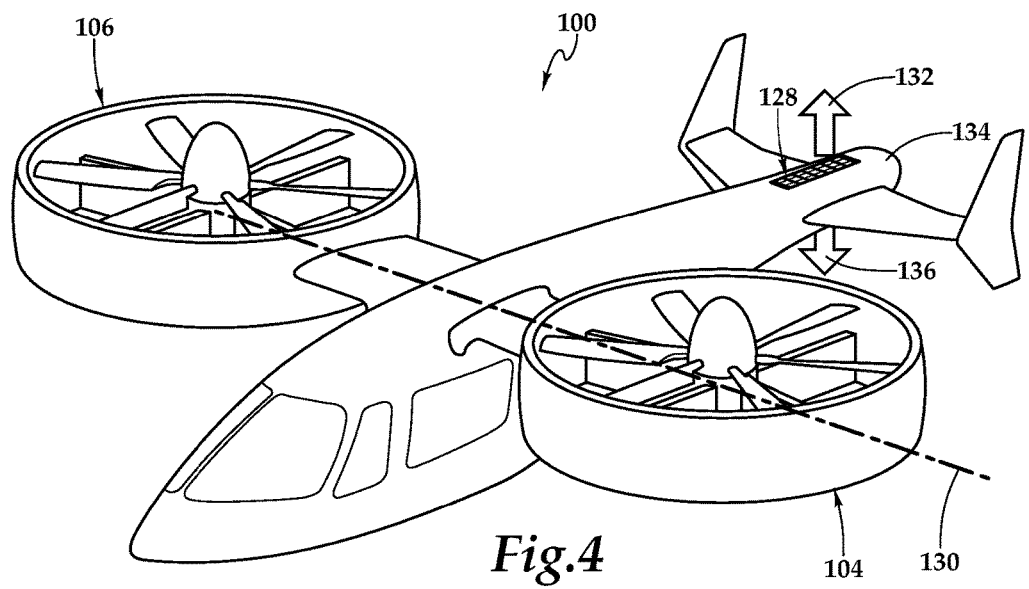

Referring to FIG. 4, variable thrust cross-flow fan system 128 is shown to produce a pitch control thrust for aircraft 100 during vertical takeoff and landing mode. The pitch control moment produced by variable thrust cross-flow fan system 128 may be used to maintain a substantially horizontal attitude of aircraft 100 during hover and when aircraft 100 transitions between forward flight mode and vertical takeoff and landing mode. The pitch control thrust produced by variable thrust cross-flow fan system 128 is a variable and reversible thrust in an upward or downward direction that produces a moment about axis 130. In particular, variable thrust cross-flow fan system 128 may produce upward thrust 132 such that tailboom 134 rises relative to axis 130. Conversely, variable thrust cross-flow fan system 128 may produce a downward thrust 136 such that tailboom 134 lowers relative to axis 130. Upward and downward thrusts 132, 136 may have any intensity needed in the operational circumstance to adjust the pitch, or moment, about axis 130.

Referring to FIGS. 5, 6A-6C, 7A-7C and 8 in the drawings, a variable thrust cross-flow fan system, including various configurations thereof, is schematically illustrated and generally designated 200. Variable thrust cross-flow fan system 200 is one embodiment, among many, of variable thrust cross-flow fan system 128 in FIG. 4. Variable thrust cross-flow fan system 200 includes a cross-flow fan assembly 202. Cross-flow fan assembly 202 includes a forward driver plate 204 and an aft driver plate 206, which are coupled to, and rotatable by, drive shaft 208. Cross-flow fan assembly 202 also includes blades 210a-210g. Each blade 210a-210g has a respective forward end 212a-212g and a respective aft end 214a-214g. The forward ends 212a-212g of each of blades 210a-210g are rotatably coupled to an aft side of forward driver plate 204. The aft ends 214a-214g of blades 210a-210g are rotatably coupled to a forward side 216 of aft driver plate 206. Thus, when drive shaft 208 rotates forward and aft driver plates 204, 206, blades 210a-210g may rotate or pivot while rotating around drive shaft 208. In the illustrated embodiment, cross-flow fan assembly 202, along with blades 210a-210g, rotate in a direction indicated by an arrow 217.

Figures 5, 8:
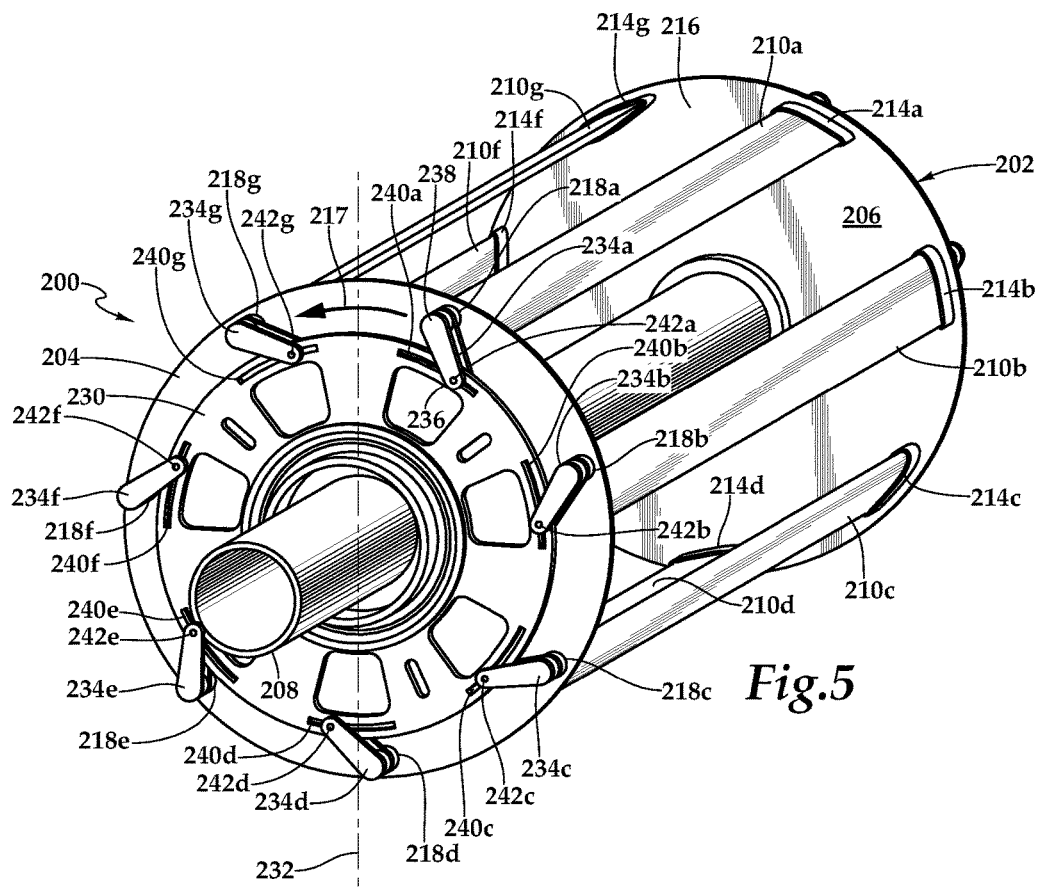
FIG. 5 is an isometric view of a variable thrust cross-flow fan system in accordance with embodiments of the present disclosure.
FIG. 8 is a top view of a blade of a variable thrust cross-flow fan system in accordance with embodiments of the present disclosure.

Forward driver plate 204 forms linkage holes 218a-218g. Driver plate 206 also forms corresponding linkage holes that are not visible in the illustrated embodiments. As best seen in FIG. 8, forward end 212a of blade 210a includes a forward driver pin 222 and aft end 214a of blade 210a includes an aft driver pin 224. Blades 210b-210g include similar forward and aft driver pins. Each of the forward driver pins is insertable and rotatable within a respective linkage hole 218a-218g of forward drive plate 204. Likewise, each of the aft driver pins is insertable and rotatable within a respective linkage hole formed by aft driver plate 206. In the illustrated embodiment, driver pins 222, 224 are integral with or coupled to respective end caps 226, 228, as best seen in FIG. 8. In another embodiment, driver pins 222, 224 may be the opposite ends of a shaft (not shown) that extends longitudinally through the body of blade 210a.

Variable thrust cross-flow fan system 200 includes a control cam 230, which is movable relative to cross-flow fan assembly 202, and in particular to forward driver plate 204, along axis 232. In the illustrated embodiment, control cam 230 rotates at substantially the same speed and direction 217 as cross-flow fan assembly 202. Control cam 230 is coupled to blades 210a-210g. In particular, control cam 230 is coupled to blades 210a-210g by linkages 234a-234g. With particular reference to linkage 234a in FIG. 5, linkage 234a has an inner end 236 and an outer end 238. Outer end 238 of linkage 234a is fixedly coupled to forward driver pin 222 of blade 210a, and therefore blade 210a does not rotate relative to linkage 234a. Similarly, each of linkages 234b-234g is fixedly coupled to a respective one of blades 210b-210g, as illustrated.

Figure 6A:
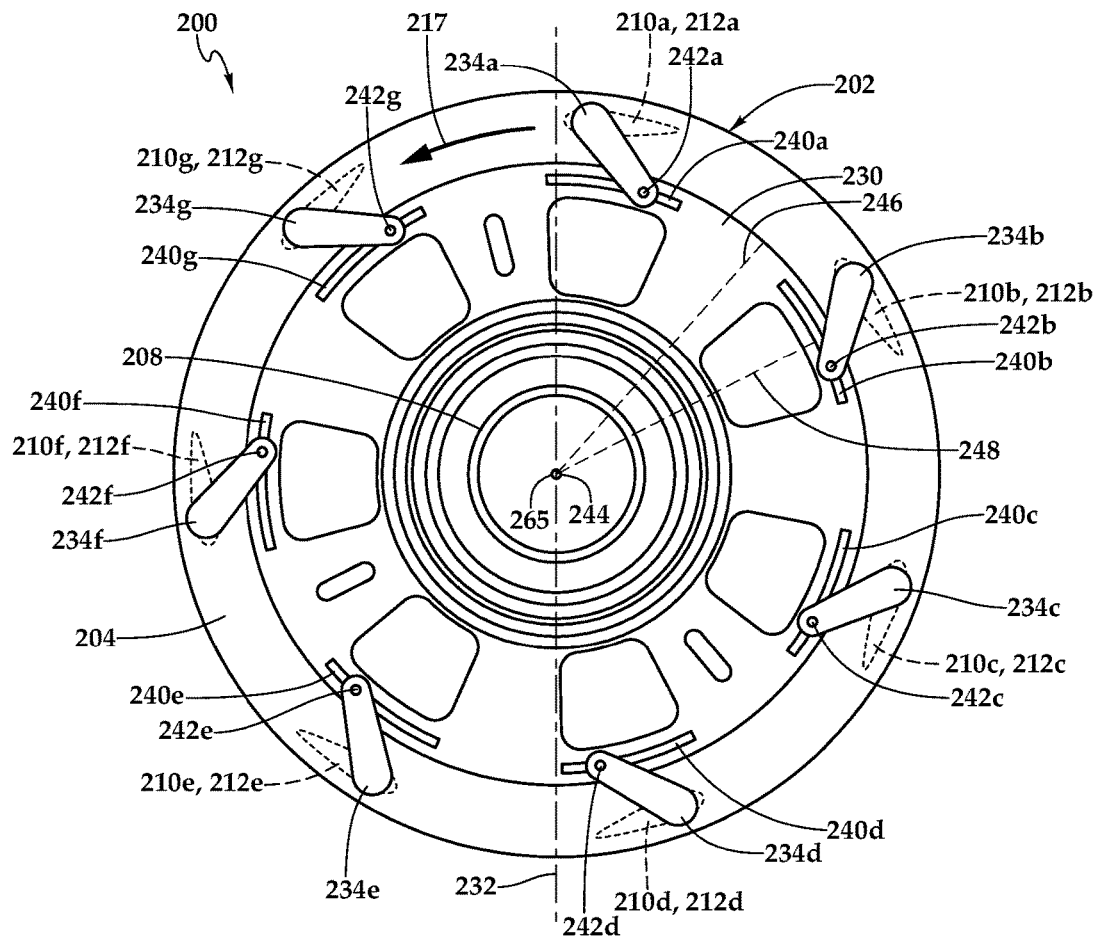
FIGS. 6A-6C are side views of a variable thrust cross-flow fan system in accordance with embodiments of the present disclosure.

Inner end 236 of linkage 234a is slidably coupled to control cam 230 at follower slot 240a of control cam 230. Similarly, inner ends of linkages 234b-234g are coupled to control cam 230 at follower slots 240b-240g of control cam 230. Follower slots 240a-240g allow the inner ends of linkages 234a-234g to move concentrically relative to control cam 230, while constraining the inner ends of linkages 234a-234g from moving in the radial direction. Referring again to linkage 234a as representative of all linkages 234a-234g, inner end 236 of linkage 234a includes a follower pin 242a that is at least partially inserted, and slidably engaged, with follower slot 240a. Indeed, follower pin 242a may slide along all or a portion of the length of follower slot 240a. In some embodiments, follower pin 242a may extend between two portions of linkage 234a that are on opposite sides of control cam 230. Similarly, follower pins 242a-242g on the inner end of each of linkages 234a-234g are slidably engaged with their respective follower slots 240a-240g in the same or similar manner as that described for linkage 234a. With particular reference to FIG. 6A, control cam 230 is generally circular having a center point 244 and radius 246. Each of follower slots 240a-240g form at least a portion of a circle, or circular arc, and has center point 244 and radius 248. In the illustrated embodiment, radius 246 of control cam 230 is larger than radius 248 of follower slots 240a-240g. Together, control cam 230, linkages 234a-234g and follower pins 242a-242g may be considered a control assembly coupled to blades 210a-210g.

Figure 7A:
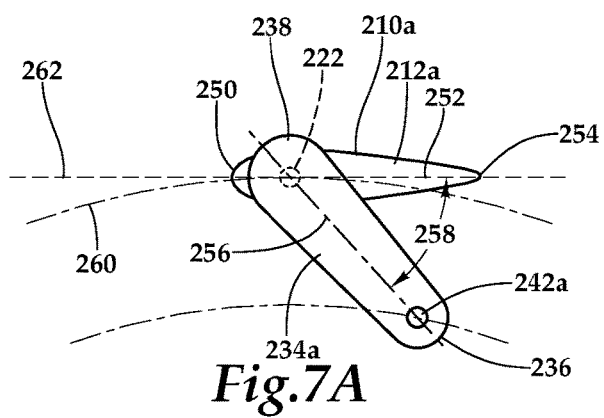
FIGS. 7A-7C are side views of a blade of a variable thrust cross-flow fan system having various pitch angles in accordance with embodiments of the present disclosure.

With particular reference to FIG. 7A, blade 210a has leading edge 250 and chord line 252. Chord line 252 extends from leading edge 250 to trailing edge 254 of blade 210a. Chord line 252 has a length L. In some embodiments, forward driver pin 222 may be located a distance of approximately L/4, or quarter chord, from leading edge 250. In other embodiments, blade 210a may be rotatable around a point that is L/4 from leading edge 250, whether or not forward driver pin 222 is utilized. In yet other embodiments, forward driver pin 222, or a point of rotation for blade 210a, may be located anywhere along chord line 252. Each of blades 210a-210g may have the same or similar placement of a point of rotation or a forward driver pin as that described with respect to blade 210a in FIG. 7A.

In the illustrated embodiment, blades 210a-210g form an acute angle with the respective linkages 234a-234g to which they are coupled. With particular reference to FIG. 7A, linkage 234a has a centerline 256. Angle 258 formed between chord line 252 of blade 210a and centerline 256 of linkage 234a is an acute angle. In other embodiments, angle 258 may be another type of angle, such as an obtuse angle. Control cam 230 is shown in the illustrated embodiments to be circular, however, a control cam of the present disclosure may be any shape that enables some or all of the control cam functionality described in the illustrative embodiments. For example, control cam 230 may have an irregular shape, while still forming follower slots 240a-240g.

Cross-flow fan assembly 202, and therefore blades 210a-210g, may have any length depending on the application. Varying the length of blades 210a-210g may help to accommodate the centrifugal load on each of blades 210a-210g. By way of non-limiting example, blades 210a-210g may be on the order of one or more inches or one or more feet. In addition, while the illustrated embodiments show cross-flow fan assembly 202 to have seven blades 210a-210g, cross-flow fan assembly 202 may have any number of blades depending on the particular application both less than or greater than seven. The number of linkages, follower slots, follower pins and other parts accompanying each blade may also vary as the number of blades changes. Blades 210a-210g preferably have a shape suitable for providing thrust in accordance with the illustrative embodiments. By way of non-limiting example, blades 210a-210g may have an airfoil shape, arc shape or teardrop shape. Blades 210a-210g may also be either symmetric or non-symmetric along each blade's chord line. Blades 210a-210g may have any thickness or stiffness suitable to withstand the centrifugal load of the particular application and may be formed from any suitable material, including metals such as aluminum and composites such as carbon epoxy. Blades 210a-210g may be hollow or solid and may be formed using any suitable method of manufacture.

To produce thrust, blades 210a-210g may move into one of an infinite number of pitch angle configurations in response to movement of control cam 230 along axis 232. Control cam 230 is movable relative to forward driver plate 204, and in particular, control cam 230 is movable, or translatable, into an infinite number of positions along a plane substantially parallel to forward driver plate 204. By traveling along axis 232, control cam 230 rotates blades 210a-210g via linkages 234a-234g. While each of blades 210a-210g may have a different pitch angle, the positions of all of blades 210a-210g are referred to, in the collective sense, as pitch angle configurations. In some embodiments, the control assembly is operable to change the pitch angle configuration of blades 210a-210g to selectively generate thrust in a plurality of directions including a first direction and a second, opposite direction.

In the illustrated embodiment, blades 210a-210g rotate in a counterclockwise manner, indicated by arrow 217, along a circular path of travel 260. Depending on the pitch angle configuration, each blade 210a-210g may have a positive, negative or zero pitch angle at any particular point around circular path of travel 260 during each revolution. Blade 210a is shown to have substantially zero pitch in FIG. 7A, a positive pitch angle in FIG. 7B and a negative pitch angle in FIG. 7C. Referring particularly to FIG. 7A, circular path of travel 260 is the path along which forward driver pin 222 travels. A tangential projection 262 is also shown for blade 210a. For purposes of reference, tangential projection 262 is tangential to the circular path of travel 260 at a point at which circular path of travel 260 and forward driver pin 222 intersect. Tangential projection 262 may also be a line tangential to the circular path of travel of a point of rotation for blade 210a. In FIG. 7A, blade 210a may be considered to have substantially zero, or extremely low, pitch because the angle between tangential projection 262 and chord line 252 of blade 210a is substantially, or very close to, zero.

Figure 6B:
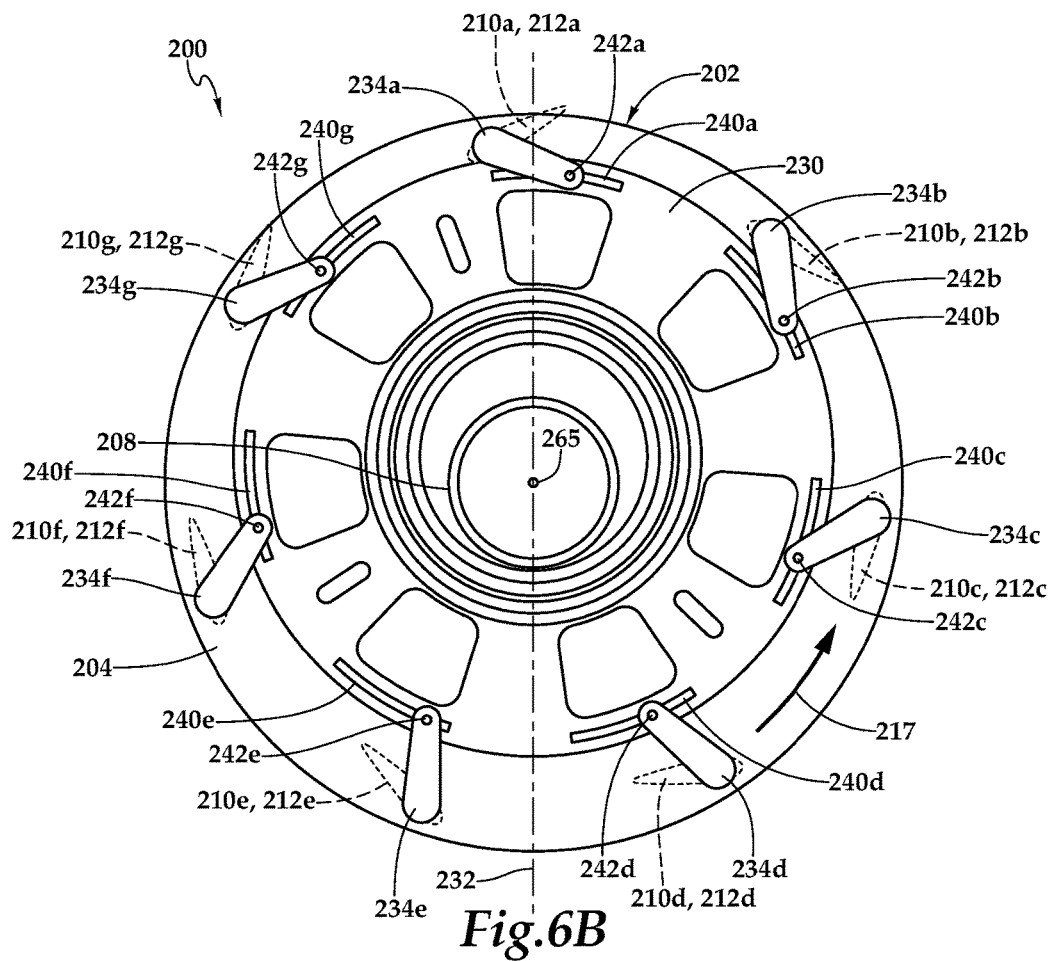
Figure 7B:
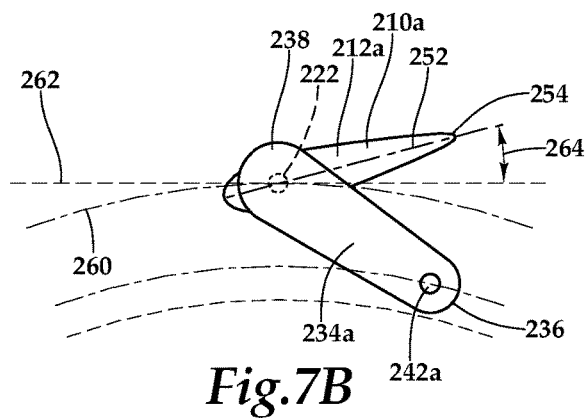
Figure 6C:
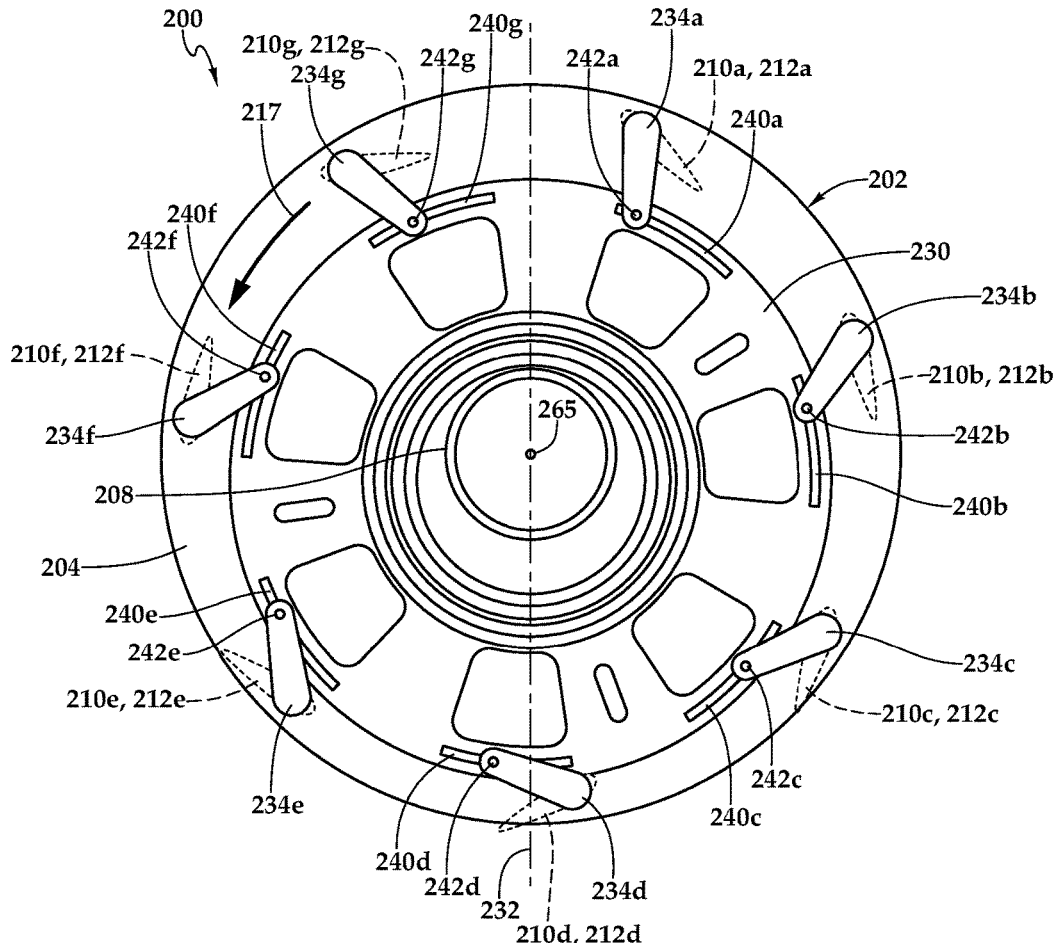
Figure 7C:
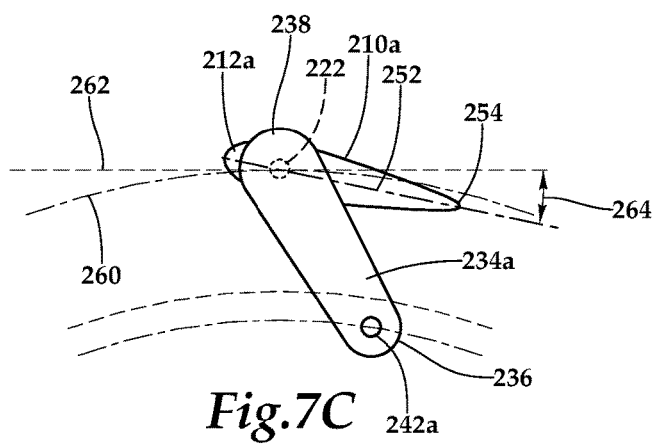

Referring to FIGS. 6B and 7B, blade 210a is shown to have a positive pitch angle. Blade 210a has a positive pitch angle because trailing edge 254 is biased away from center point 265 of circular path of travel 260 and angle 264 formed between chord line 252 and tangential projection 262 is non-zero. Referring to FIGS. 6C and 7C, blade 210a has a negative pitch angle because trailing edge 254 of blade 210a is biased towards center point 265 of circular path of travel 260 and angle 264 formed between chord line 252 and tangential projection 262 is non-zero.

Referring to FIGS. 6A-6C, three positions of control cam 230 are shown. In FIG. 6A, control cam 230 is substantially concentric with drive shaft 208, forward driver plate 204 and circular path of travel 260. In this state, blades 210a-210g are in a neutral configuration and each of blades 210a-210g have a substantially zero pitch during each rotation around circular path of travel 260, as illustrated in FIG. 7A. When blades 210a-210g are in the neutral configuration, all of blades 210a-210g have a zero angle of attack, and therefore produce no thrust in either direction.

Referring to FIG. 6B, blades 210a-210g are in a downward thrust configuration as a result of control cam 230 moving to an upward position relative to the aircraft. In the downward thrust configuration, the pitch angles of each of blades 210a-210g fluctuate between positive and negative pitch angles during each revolution around circular path of travel 260 such that a downward thrust is produced thereby. When control cam 230 is in a position that causes blades 210a-210g to be in the downward thrust position, blades 210a-210g rotate eccentrically in relation to control cam 230. Control cam 230 is also eccentric to the axis of rotation of both drive shaft 208 and cross-flow fan assembly 202 while in the downward thrust position. Also, while in the downward thrust position of the illustrated embodiment, the topmost edges of control cam 230 and forward driver plate 204 are closer together than the bottommost edges of control cam 230 and forward driver plate 204. Control cam 230 moves in the opposite direction as the thrust produced when blades 210a-210g rotate along circular path of travel 260.

Blades 210a, 210b, 210g are located on a top portion of circular path of travel 260 and each have varying positive pitch angles depending on their respective locations in the rotation cycle. Blade 210a, which is substantially topmost in circular path of travel 260, has the largest positive pitch angle of all blades 210a-210g. Each blade 210a-210g progressively moves into or out of this most positive pitch angle of blade 210a as each blade 210a-210g moves into or out of the substantially topmost position at which blade 210a is shown.

Blades 210c, 210d, 210e, 210f are each on a bottom portion of circular path of travel 260 for blades 210a-210g. Blades 210c, 210d, 210e, 210f that are on the bottom portion of the circular path of travel 260 each have varying negative pitch angles. Each blade 210a-210g has its largest negative pitch angle when it reaches the bottommost point of circular path of travel 260. The pitch angles of blades 210a-210g are substantially zero at the leftmost and rightmost points of circular path of travel 260, thereby causing substantially zero thrust in the horizontal directions. Each of blades 210a-210g have substantially zero pitch angles twice during each revolution along circular path of travel 260, namely, at the leftmost and rightmost points of circular path of travel 260. Taken together, the downward thrust configuration of blades 210a-210g shown in FIG. 6B produces a downward thrust for the aircraft as blades 210a-210g rotate in the direction indicated by arrow 217.

Referring to FIG. 6C, control cam 230 has moved downward, relative to the aircraft, from the neutral position of FIG. 6A to cause blades 210a-210g to move into an upward thrust configuration. In the upward thrust configuration, blades 210a-210g rotate, along arrow 217, to produce an upward thrust for the aircraft. Similar to the downward thrust configuration shown in FIG. 6B, in the upward thrust configuration blades 210a-210g change pitch angle during each revolution around circular path of travel 260. In particular, in the upward thrust configuration each of blades 210a-210g fluctuates between a positive and negative pitch angle during each revolution around circular path of travel 260.

Control cam 230 has moved in an opposite direction from the upward thrust produced by blades 210a-210g in the upward thrust configuration. Also, the distance between the topmost point of control cam 230 and the topmost point of forward driver plate 204 is greater than the distance between the bottommost point of control cam 230 and the bottommost point of forward driver plate 204. The circular path of travel 260 in the upward thrust configuration is eccentric to control cam 230. In the upward thrust configuration, control cam 230 is also eccentric to the axis of rotation of drive shaft 208 and cross-flow fan assembly 202. In the upward thrust configuration, blades 210c, 210d, 210e, located on the bottom portion of circular path of travel 260, each have positive pitch angles that are different from one another. Blades 210a, 210b, 210f, 210g, located on the top portion of circular path of travel 260, each have varying negative pitch angles. Blades 210a-210g, when at the leftmost or rightmost point of each revolution, have a substantially zero pitch angle, thereby producing substantially zero horizontal thrust in the illustrated embodiment. Each of blades 210a-210g have substantially zero pitch angles twice during each revolution along circular path of travel 260, namely, at the leftmost and rightmost points of circular path of travel 260.

In the downward and upward thrust configurations shown in FIGS. 6B and 6C, each blade 210a-210g may produce a lift, or thrust, force approximately along a radial line between each blade's quarter chord point and center point 265 of circular path of travel 260. The thrust force generated by each blade 210a-210g may be proportional to the angle of attack, or pitch, of the individual blade. In the manner described, a pilot of the aircraft may vary the thrust of variable thrust cross-flow fan system 200 by changing the lateral position of control cam 230. The downward and upward thrusts described herein, opposite in direction, are produced by a single cross-flow fan assembly 202 that rotates at a substantially constant speed that is substantially equal to the rotational speed of drive shaft 208. Indeed, control cam 230 may be in an infinite number of positions along the axis 232 to produce an infinite number of potential thrust intensities in either the downward or upward direction. By producing a reversible thrust in this manner from the tailboom of the aircraft, a pilot of the aircraft, by controlling the position of control cam 230, may manage the pitch of the aircraft during flight.

Referring next to FIGS. 9A-9E and 10 in the drawings, a variable thrust cross-flow fan system is schematically illustrated and generally designated 300. Variable thrust cross-flow fan system 300 includes a plurality of blades 302a-302h that are shown in a variety of pitch angle configurations, which change in response to an input received from a pilot of the aircraft or from elsewhere. FIGS. 9A-9E show a tailboom housing 304 having a left portion 304a and a right portion 304b. The illustrated cross sections are viewed from a location aft of the aircraft. In the illustrated embodiment, it is noted that blades 302a-302h form obtuse angles with the respective linkages to which they are attached. As discussed above, blades 302a-302h may form either obtuse or acute angles with their respective linkages. Also, in the illustrated embodiment, blades 302a-302h rotate in a counterclockwise direction at a substantially constant speed during aircraft flight.

Figure 9A:
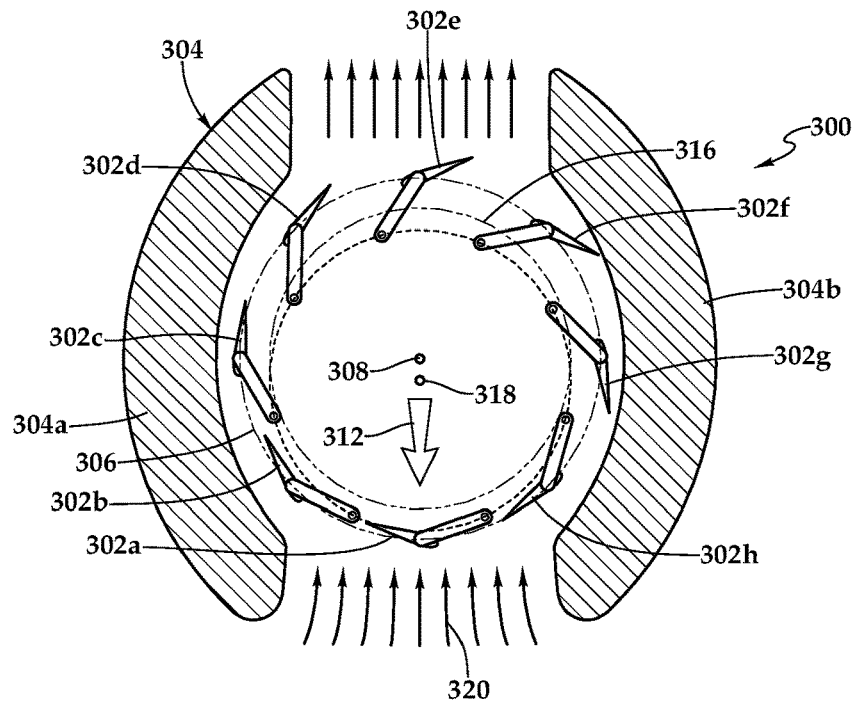
FIGS. 9A-9E are schematic illustrations of the blades of a variable thrust cross-flow fan system producing variable thrust in accordance with embodiments of the present disclosure.
Figure 9B:
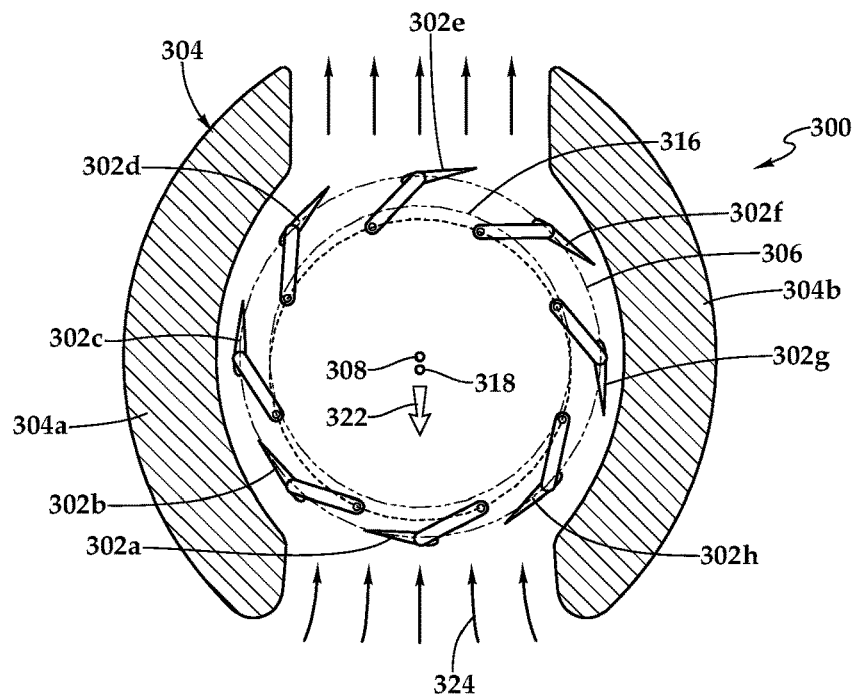
Figure 9C:
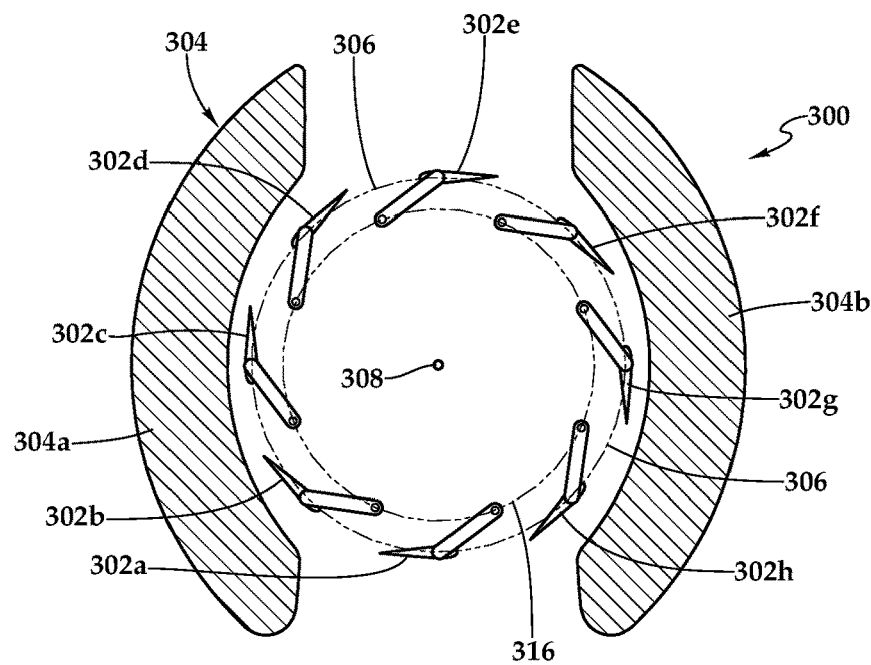

Referring specifically to FIG. 9C, blades 302a-302h are in a neutral pitch angle configuration as the control cam (not shown) is substantially concentric with circular path of travel 306 of blades 302a-302h. Input may be received from a pilot of the aircraft that causes the control cam to be shifted from the neutral position. For example, the input may be one or more switches, buttons or other controls in the cockpit of the aircraft. The switches, buttons or other controls may allow for varying degrees of input intensity, expressed as a continuum on the x-axis of FIG. 10. In particular, the switches, buttons or other controls may allow for input ranging from −100% to 100%, and points therebetween. Other examples of input controls by which the control cam may be moved to produce a reversible thrust include a control stick, knobs, sliders, voice controls, touchscreen controls or electronic input, to name a few. Each of these input controls may allow for the continuum of input positions expressed on the x-axis of FIG. 10. In this manner, the reversible thrust produced by variable thrust cross-flow fan system 300 may have a direction and intensity that is determined by the input position originating from the cockpit of the aircraft or from elsewhere.

In the present example, in which blades 302a-302h have a neutral pitch angle configuration, substantially zero thrust is produced. A neutral position center point 308, which is the center point of the control cam when the control cam is in the neutral configuration, is shown. Further, the input position originating from an input control of the aircraft may be at 0%, as indicated by point 310 in FIG. 10. Moving to FIG. 9A, a maximum downward thrust 312 is produced by blades 302a-302h in the depicted pitch angle configuration. In this downward thrust configuration, maximum downward thrust 312 is at −100% of variable thrust cross-flow fan system's thrust range (−100% to 100%), as indicated by point 314 in FIG. 10. Maximum downward thrust 312 corresponds with an input position of −100% from one of the exemplary input controls described above.

In the maximum downward thrust configuration of FIG. 9A, the control cam has moved downward of neutral position 316 of the control cam to a maximum allowable extent. The distance that the control cam has moved is schematically illustrated by showing neutral position center point 308 relative to center point 318 of the control cam. It is also noted that the control cam has moved in the same direction as the thrust produced by blades 302a-302h. This is in contrast to the illustrative embodiments shown in FIGS. 5, 6A-6C, 7A-7C and 8, in which the control cam moved in an opposite direction as the thrust produced by the blades of the variable thrust cross-flow fan system. Among other factors, the direction that the control cam moves relative to the thrust direction may be caused by whether the angle between each blade and its respective linkage is acute or obtuse. Air flows through blades 302a-302h as indicated by high-density airflow arrows 320. It is noted that air flows through blades 302a-302h in an opposite direction as the thrust produced by blades 302a-302h.

Figure 10:
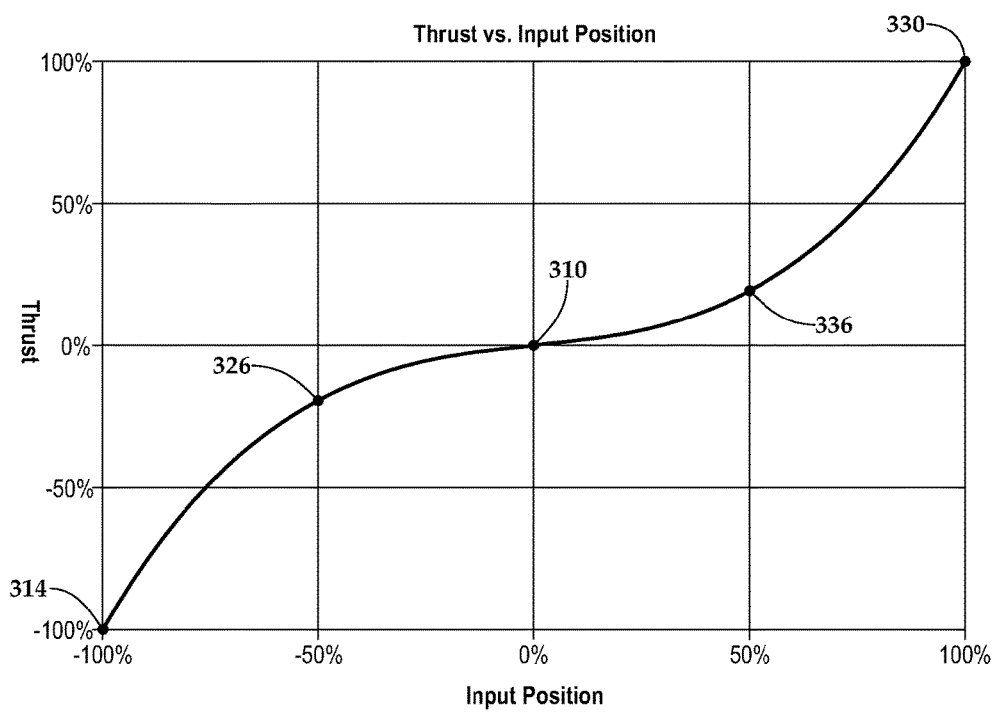
FIG. 10 is a chart illustrating input position versus thrust for a variable thrust cross-flow fan system in accordance with embodiments of the present disclosure.

Moving to FIG. 9B, blades 302a-302h remain in a downward thrust pitch angle configuration. However, the control cam is closer to neutral position 316 than it was in FIG. 9A, thereby causing an intermediate downward thrust 322, which is less than maximum downward thrust 312 in FIG. 9A. The reduced thrust is generated as the maximum pitch angles of blades 302a-302h are reduced and the airflow through variable thrust cross-flow fan system 300 is reduced as indicated by the reduced density airflow arrows 324. The distance that the control cam has moved is schematically illustrated by showing neutral position center point 308 relative to center point 318 of the control cam. With reference to FIG. 10, intermediate downward thrust 322 is approximately 20% of maximum downward thrust 312, as indicated by point 326. In the illustrated embodiment, an input position of −50% produces the intermediate downward thrust 322 of approximately 20% of maximum downward thrust 312.

In the downward thrust configurations shown in FIGS. 9A and 9B, as each blade 302a-302h follows circular path of travel 306, blades 302a-302h transition between positive pitch, zero pitch, negative pitch, zero pitch and back to positive pitch during each revolution of the cross-flow fan assembly. As blades 302a-302h approach the topmost point of circular path of travel 306, the blades have progressively greater positive pitch reaching a maximum positive pitch at the topmost point of circular path of travel 306. Thereafter, as blades 302a-302h retreat from the topmost point of circular path of travel 306, the blades have progressively lesser positive pitch reaching zero pitch proximate leftmost point of circular path of travel 306. As blades 302a-302h approach the bottommost point of circular path of travel 306, the blades have progressively greater negative pitch reaching a maximum negative pitch at the bottommost point of circular path of travel 306. Thereafter, as blades 302a-302h retreat from the bottommost point of circular path of travel 306, the blades have progressively lesser negative pitch, reaching zero pitch proximate rightmost point of circular path of travel 306. Each blade 302a-302h repeats this cycle on each revolution of the cross-flow fan assembly.

Figure 9D:
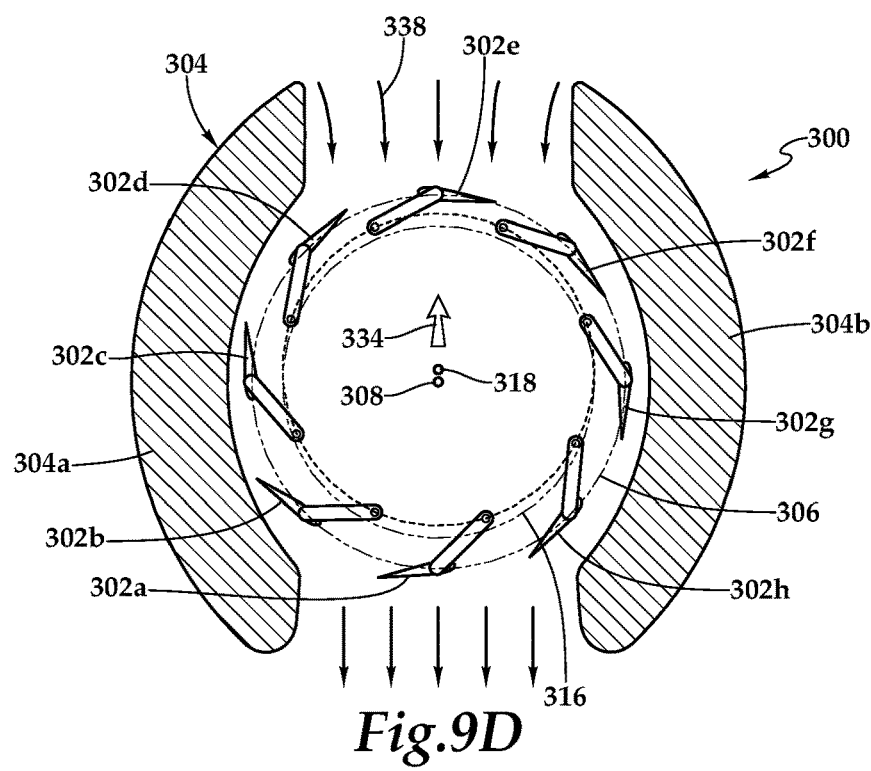
Figure 9E:
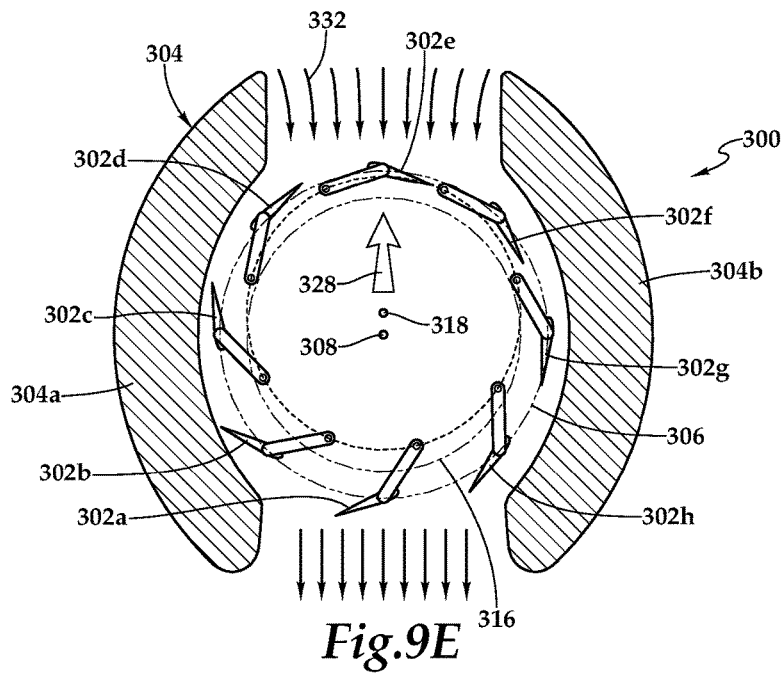

With reference to FIG. 9E, a maximum upward thrust 328 is produced by blades 302a-302h in the depicted pitch angle configuration which corresponds to point 330 in FIG. 10 and the 100% location on the continuum of −100% to 100%. When blades 302a-302h produce maximum upward thrust 328, the control cam has been moved a maximum allowable distance upward of neutral position 316. The distance that the control cam has moved is schematically illustrated by showing neutral position center point 308 relative to center point 318 of the control cam. In the illustrated embodiment, an upward move of the control cam corresponds to an upward thrust. The upward thrust that is produced by blades 302a-302h is the opposite of the airflow direction through blades 302a-302h, as indicated by high-density airflow arrows 332. As shown in FIG. 10, maximum upward thrust 328 corresponds with an input position of 100% from one of the exemplary input controls described above.

Finally, with reference to FIG. 9D, blades 302a-302h produce an intermediate upward thrust 334 in the depicted pitch angle configuration. Intermediate upward thrust 334 is less than maximum upward thrust 328. In particular, intermediate upward thrust 334 is approximately 20% of maximum upward thrust 328, as indicated by point 336 in FIG. 10. The control cam is closer to neutral position 316 than in the maximum upward thrust configuration of FIG. 9E. The distance that the control cam has moved is schematically illustrated by showing neutral position center point 308 relative to center point 318 of the control cam. To achieve intermediate upward thrust 334, the input position has been set at 50% from one of the exemplary input controls described above, as shown in FIG. 10. The reduced thrust is generated as the maximum pitch angles of blades 302a-302h are reduced and the airflow through variable thrust cross-flow fan system 300 is reduced as indicated by the reduced density airflow arrows 338.

In the upward thrust configurations shown in FIGS. 9D and 9E, as each blade 302a-302h follows circular path of travel 306, blades 302a-302h transition between positive pitch, zero pitch, negative pitch, zero pitch and back to positive pitch during each revolution of the cross-flow fan assembly. As blades 302a-302h approach the bottommost point of circular path of travel 306, the blades have progressively greater positive pitch reaching a maximum positive pitch at the bottommost point of circular path of travel 306. Thereafter, as blades 302a-302h retreat from the bottommost point of circular path of travel 306, the blades have progressively lesser positive pitch reaching zero pitch proximate rightmost point of circular path of travel 306. As blades 302a-302h approach the topmost point of circular path of travel 306, the blades have progressively greater negative pitch reaching a maximum negative pitch at the topmost point of circular path of travel 306. Thereafter, as blades 302a-302h retreat from the topmost point of circular path of travel 306, the blades have progressively lesser negative pitch, reaching zero pitch proximate leftmost point of circular path of travel 306. Each blade 302a-302h repeats this cycle on each revolution of the cross-flow fan assembly.

FIGS. 9A-9E illustrate the variability of the thrust based upon the pitch angle configuration of blades 302a-302h which varies responsive to control cam movement. As illustrated and described, the thrust generated by variable thrust cross-flow fan system 300 is variable in both intensity and direction, either an upward or downward direction, and is therefore reversible. Even though five pitch angle configurations of blades 302a-302h have been shown in FIGS. 9A-9E, it should be understood by those skilled in the art that blades 302a-302h may have an infinite number of pitch angle configurations producing an infinite number of thrust intensities, by moving the control cam along an infinite number of possible points along an axis lateral to the direction of travel of the aircraft. Indeed, with reference to FIG. 10, the thrust intensity and direction may vary according to the illustrated curve, including any point thereon. In this manner, a pilot may vary the input position of an input control to vary the thrust intensity and direction produced by variable thrust cross-flow fan system 300 to manage the pitch of the aircraft. Even though a particular input versus moment curve has been depicted and described, it should be understood by those skilled in the art that the input versus moment curve for a particular implementation will vary based upon factors including the size, shape and materials used to form the blades, the number of blades, the rotational speed of the cross-flow fan system and other parameters.

Figure 11:
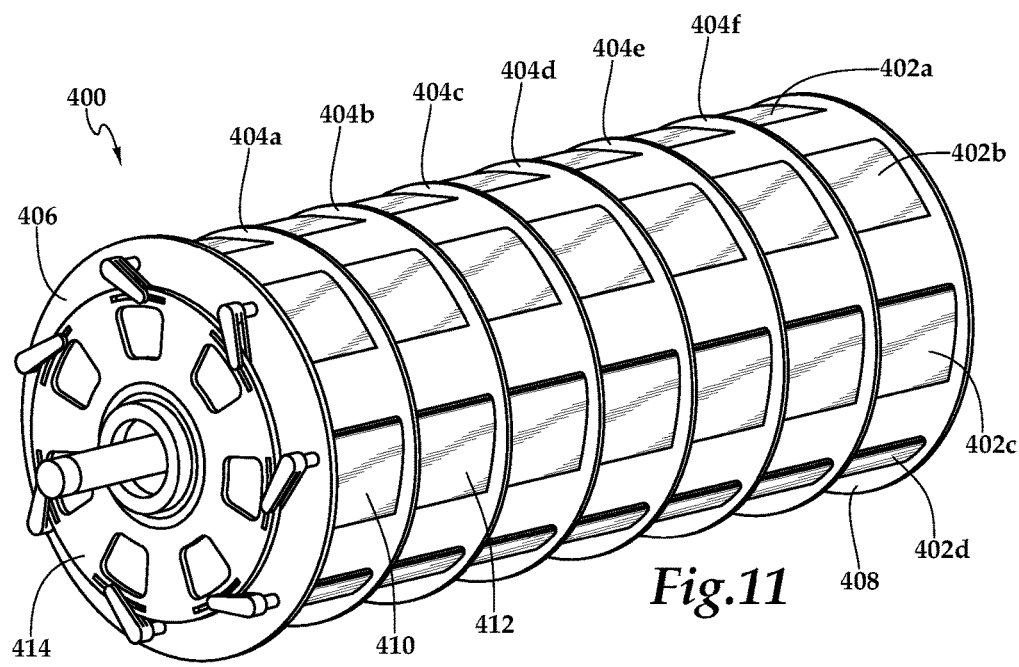
FIG. 11 is an isometric view of a variable thrust cross-flow fan system in accordance with embodiments of the present disclosure.

Referring now to FIG. 11 in the drawings, a variable thrust cross-flow fan system is schematically illustrated and generally designated 400. In the illustrative embodiment, variable thrust cross-flow fan system 400 includes a plurality of blades, only blades 402a-402d being visible, wherein each of the blades is divided into seven blade segments. The blade segments of each blade 402a-402d are separated by divider plates 404a-404f, which are disposed at regular intervals between forward driver plate 406 and aft driver plate 408. Each of divider plates 404a-404f is substantially parallel to both forward driver plate 406 and aft driver plate 408. In addition, divider plates 404a-404f may be substantially the same shape as forward driver plate 406 and aft driver plate 408. Each divider plate 404a-404f divides adjacent segments of each blade 402a-402d. For example, divider plate 404a divides blade segments 410, 412 of blade 402c. By dividing blades 402a-402d into smaller blade segments, divider plates 404a-404f may increase the tolerance of blades 402a-402d to centrifugal forces resulting from the rotation of the cross-flow fan assembly. An actuator assembly (not shown), such as actuator assembly 68 in FIG. 1B, may move control cam 414 in a number of ways, including via mechanical actuation, hydraulic actuation or electronic actuation in a fly-by-wire environment, so as to change the pitch angle configuration of blades 402a-402d using input controls as described above.

Figure 12:
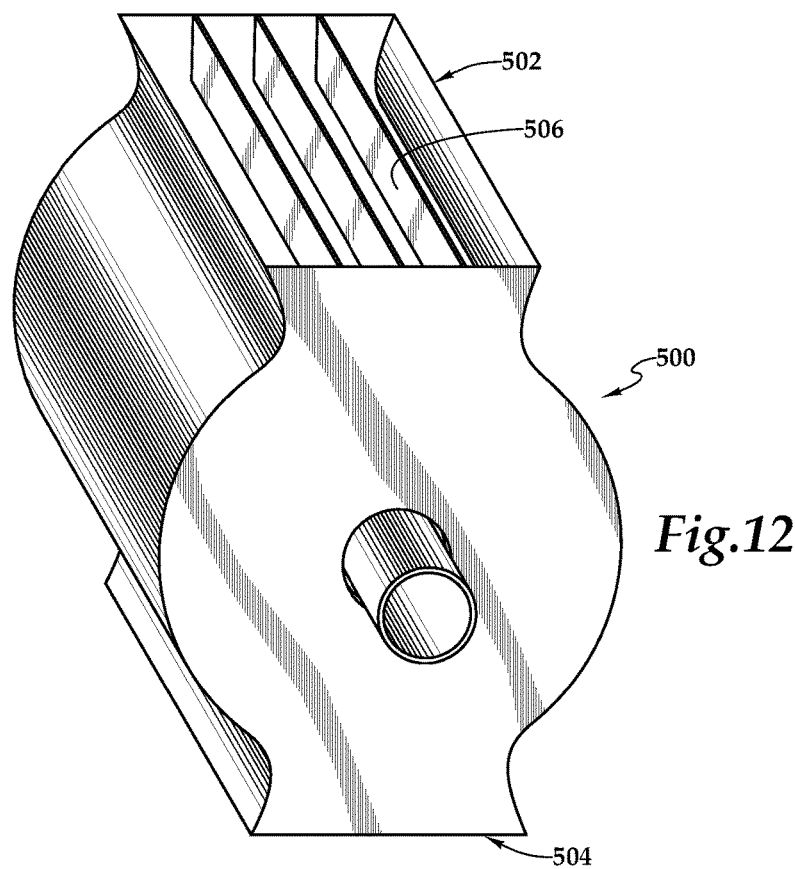
FIG. 12 is an isometric view of a housing for a variable thrust cross-flow fan system in accordance with embodiments of the present disclosure.

Referring to FIG. 12 in the drawings, a housing assembly for a variable thrust cross-flow fan system is schematically illustrated and generally designated 500. Housing 500 provides an enclosure for the moving parts of a variable thrust cross-flow fan system and forces airflow to follow a predetermined path. Housing 500 may be mounted in or be formed integrally with the tailboom of the aircraft. In the illustrated embodiment, housing 500 includes a top housing duct 502, which may open onto the top side of the tailboom. Housing 500 also includes a bottom housing duct 504, which may open up to the bottom side of the tailboom. Top housing duct and bottom housing duct 502, 504 allow air to pass through the housing 500 so that thrust may be generated in accordance with the illustrative embodiments described above. Each housing duct 502, 504 includes a plurality of longitudinal slats 506 to provide for directional control of the airflow and thrust of the variable thrust cross-flow fan system. Slats 506 may be adjustable or movable based on input from a pilot to enable thrust vectoring operations. For example, slats 506 may be tilted such that an upward thrust generated by the variable thrust cross-flow fan system has a leftward or rightward component, thereby providing yaw, in addition to pitch, control of the aircraft.

Alternatively or additionally, housing ducts 502, 504 could include lateral slats, substantially perpendicular to slats 506, for additional directional control of the airflow and thrust of the variable thrust cross-flow fan system. Furthermore, while housing 500 is shown to have oppositely disposed housing ducts on its top and bottom sides, a housing of the present disclosure may have housing ducts in other locations and other orientations, including left housing ducts, right housing ducts, or any combination of two or more housing ducts disposed about a variable thrust cross-flow fan system of the present disclosure. Housing 500 may also be rotatable about a longitudinal axis of the tailboom so that a reversible thrust may be generated in any radial direction emanating from the longitudinal axis. In embodiments in which alternate thrust patterns are permitted, the control cam may be allowed to travel in directions other than the lateral vertical axis of the aircraft to enable variable thrust. For example, the control cam may be allowed to travel diagonally or horizontally in order to create the desired thrust direction and intensity of the variable thrust cross-flow fan system. By allowing for a thrust in all radial directions surrounding the tailboom, a pilot may control both the yaw and pitch of the aircraft.

Housing 500 may be used to achieve a pressure differential that allows for more efficient thrust. In some examples, an 80-100% improvement in thrust may be achievable using such a pressure differential. Housing 500 also provides protection for the blades of the variable thrust cross-flow fan system, such as by preventing objects from hitting the blades. Housing 500 also prevents injury by creating a barrier between people and the blades.

Figure 13:
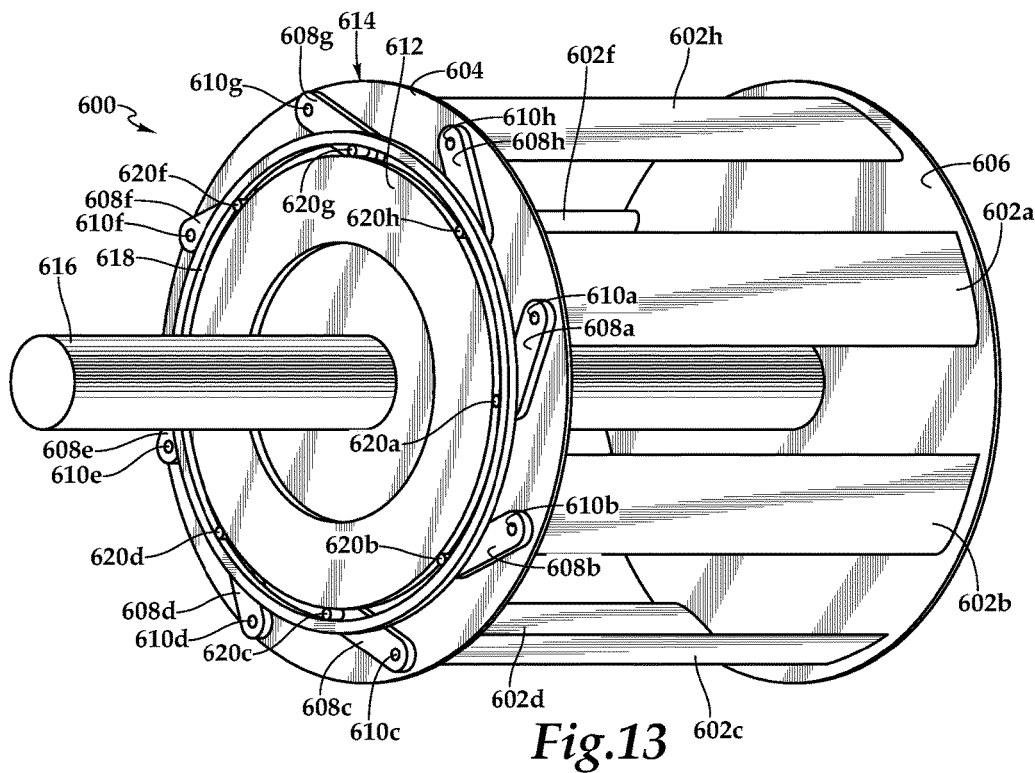
FIG. 13 is an isometric view of a variable thrust cross-flow fan system in accordance with embodiments of the present disclosure.

Referring to FIG. 13 in the drawings, a variable thrust cross-flow fan system is schematically illustrated and generally designated 600. Variable thrust cross-flow fan system 600 includes a plurality of blades 602a-602h that are rotatably coupled to driver plates 604, 606. Blades 602a-602h are fixably coupled to respective linkages 608a-608h via driver pins 610a-610h. In contrast to previously illustrated embodiments, control cam 612 is non-rotating relative to cross-flow fan assembly 614 and drive shaft 616. Instead, control cam 612 includes one continuous follower slot 618 along which follower pins 620a-620h may move. Together, control cam 612, linkages 608a-608h, driver pins 610a-610h and follower pins 620a-620h may be considered a control assembly coupled to blades 602a-602h. As described in the above embodiments, movement of control cam 612 moves blades 602a-602h into different pitch angle configurations to provide variable thrust as well as reversible thrust in two or more directions.

Figure 14:
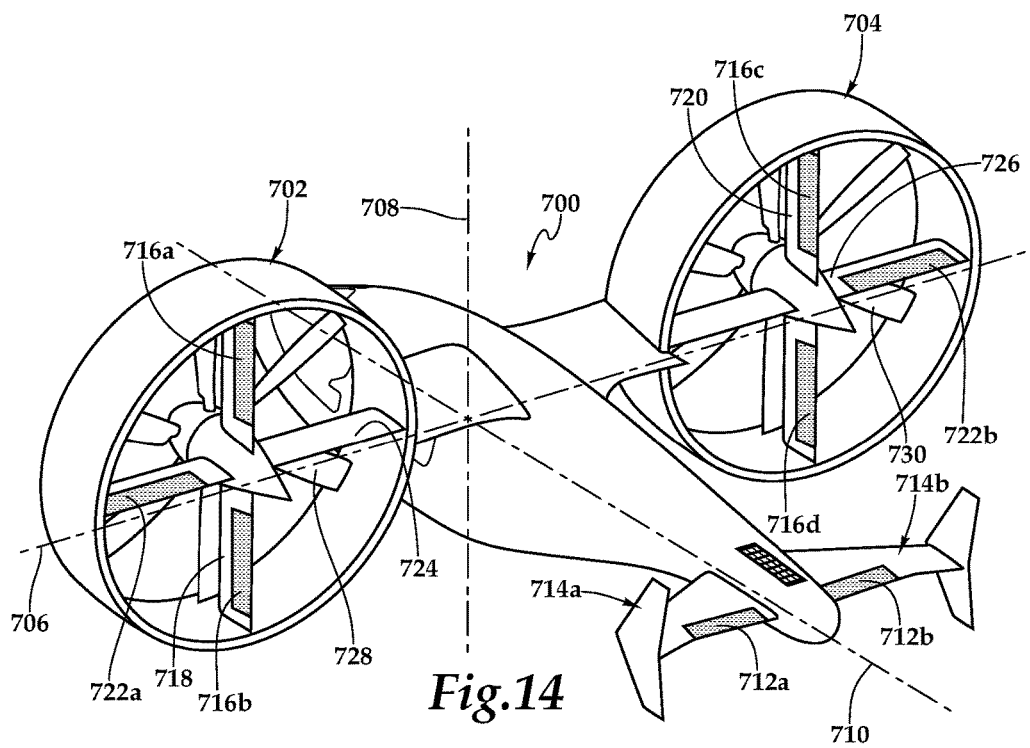
FIG. 14 is an isometric view of a tilting ducted fan aircraft having control surfaces in accordance with embodiments of the present disclosure.

Referring to FIG. 14 in the drawings, a tilting ducted fan aircraft in forward flight mode is schematically illustrated and generally designated 700. Ducted fans 702, 704 are in the vertical position while aircraft 700 is in forward flight mode. The thrusts generated by ducted fans 702, 704 are directed in the aft direction of aircraft 700 to enable forward flight. Aircraft 700 includes several control surfaces that enable aircraft 700 to control pitch about axis 706, yaw about axis 708 and roll about axis 710. Specifically, aircraft 700 includes elevators 712a, 712b rotatably mounted on an aft portion of the tailboom, and in particular on tail fins 714a, 714b, respectively. Elevators 712a, 712b may be raised or lowered to exert a moment about axis 706, thereby controlling the pitch of aircraft 700. Aircraft 700 also includes rudders 716a-716d. Rudders 716a, 716b are moveably mounted on vertical support 718 of ducted fan 702 and rudders 716c, 716d are moveably mounted on vertical support 720 of ducted fan 704. Rudders 716a-716d may be moved from side to side, independently or collectively, to exert a moment about axis 708, thereby controlling the yaw of aircraft 700. Aircraft 700 also includes ailerons 722a, 722b rotatably mounted on horizontal supports 724, 726 of ducted fans 702, 704, respectively. Ailerons 722a, 722b may be raised or lowered independent of one another to exert a moment about axis 710, thereby controlling the roll of aircraft 700.

In other embodiments, the yaw of aircraft 700 during forward flight mode may be controlled by differing the respective thrusts of ducted fans 702, 704 by independently varying or adjusting the collective pitches of blade assemblies 728, 730 of ducted fans 702, 704. For example, the thrust generated by ducted fan 704 may be increased relative to the thrust generated by ducted fan 702 by increasing the collective pitch of blade assemblies 730 relative to the collective pitch of blade assemblies 728. Independently differing the collective pitches of the ducted fans 702, 704 in this manner allows for a moment to be exerted about axis 708, thereby controlling the yaw of aircraft 700.

Referring next to FIGS. 15A-15H in the drawings, a sequential flight operating scenario of tilting ducted fan aircraft 800 is depicted. In FIGS. 15A-15H aircraft 800 transitions from grounded mode, vertical takeoff mode, forward flight mode, vertical landing mode and then back to grounded mode. Starting with FIG. 15A, aircraft 800 is on the ground with landing gear 802 deployed. Ducted fans 804, 806 may either be turned off, as in when aircraft 800 is in storage, or may be operating in a low speed, or idle, mode that produces insufficient thrust to lift aircraft 800 off the ground.

Figure 15A:
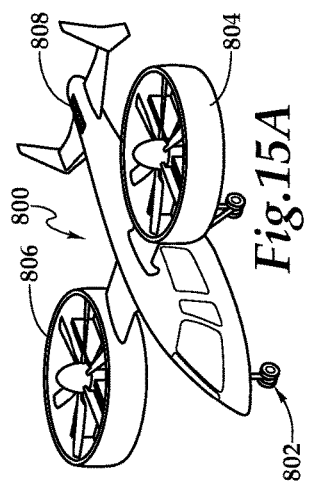
FIGS. 15A-15H are schematic illustrations of a tilting ducted fan aircraft in a sequential flight operating scenario in accordance with embodiments of the present disclosure.
Figure 15B:
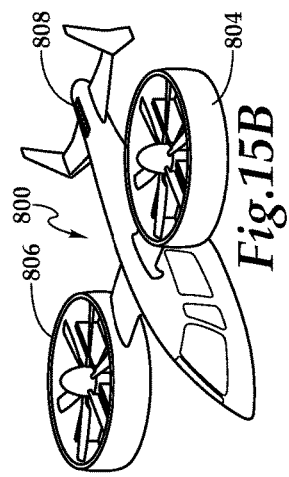
Figure 15C:
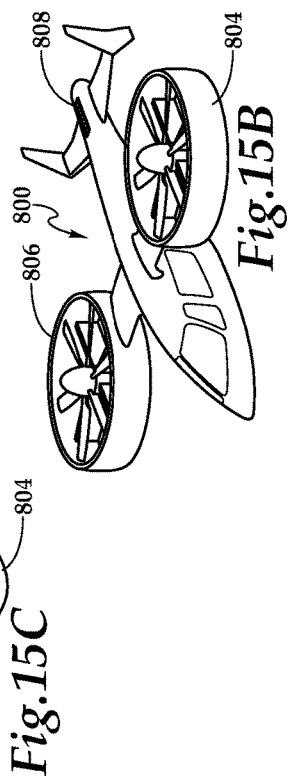
Figure 15D:
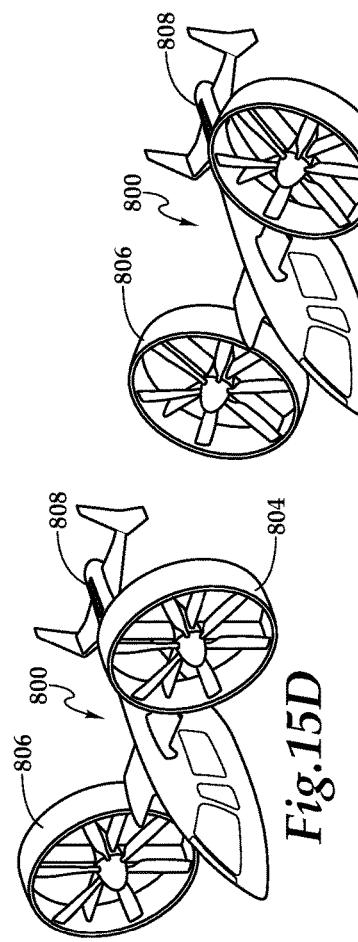
Figure 15E:
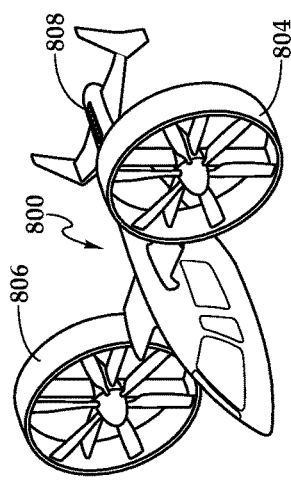

In FIG. 15B, ducted fans 804, 806 have increased rotor speed to lift aircraft 800 off of the ground so that aircraft 800 is in vertical takeoff mode. Landing gear 802 has been raised into the fuselage of aircraft 800. The pitch, yaw and roll of aircraft 800 while in vertical takeoff mode may be controlled as described in FIGS. 2, 3A, 3B and 4. In FIG. 15C, ducted fans 804, 806 transition from the horizontal position to the vertical position to enable conversion from vertical takeoff mode to forward flight mode. While ducted fans 804, 806 tilt from the horizontal to vertical position, variable thrust cross-flow fan system 808 may generate a reversible and variable thrust in the upward or downward directions to maintain the fuselage of aircraft 800 in a horizontal attitude. In FIGS. 15D and 15E, ducted fans 804, 806 are in the vertical position and aircraft 800 is in forward flight mode. In some embodiments, the pitch, yaw and roll of aircraft 800 while in forward flight mode may be controlled using a plurality of control surfaces, as described in FIG. 14.

Figure 15F:
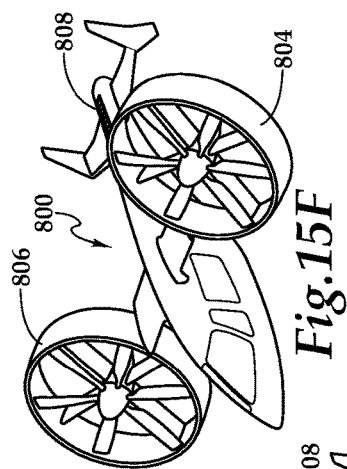
Figure 15G:
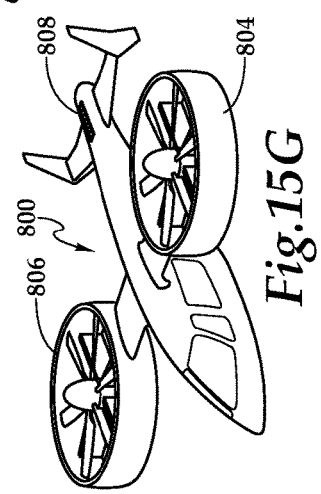
Figure 15H:
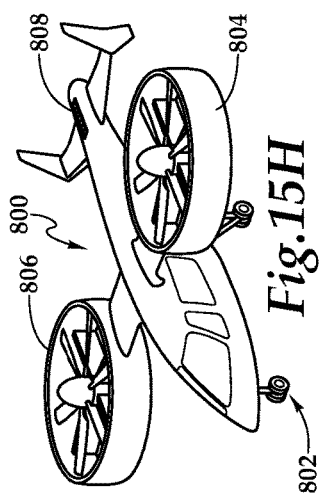

Referring to FIG. 15F, aircraft 800 transitions from forward flight mode to vertical landing mode by tilting ducted fans 804, 806 back into the horizontal position. Again, variable thrust cross-flow fan system 808 may be used to control the pitch of aircraft 800 during the transition to maintain the fuselage of aircraft 800 in a horizontal attitude. In FIG. 15G, aircraft 800 is in vertical landing mode as indicated by ducted fans 804, 806 being in the horizontal position. When vertical landing is desired, the thrusts of ducted fans 804, 806 may be lessened and landing gear 802 may be deployed so that aircraft 800 may be grounded, as shown in FIG. 15H.

Figure 16:
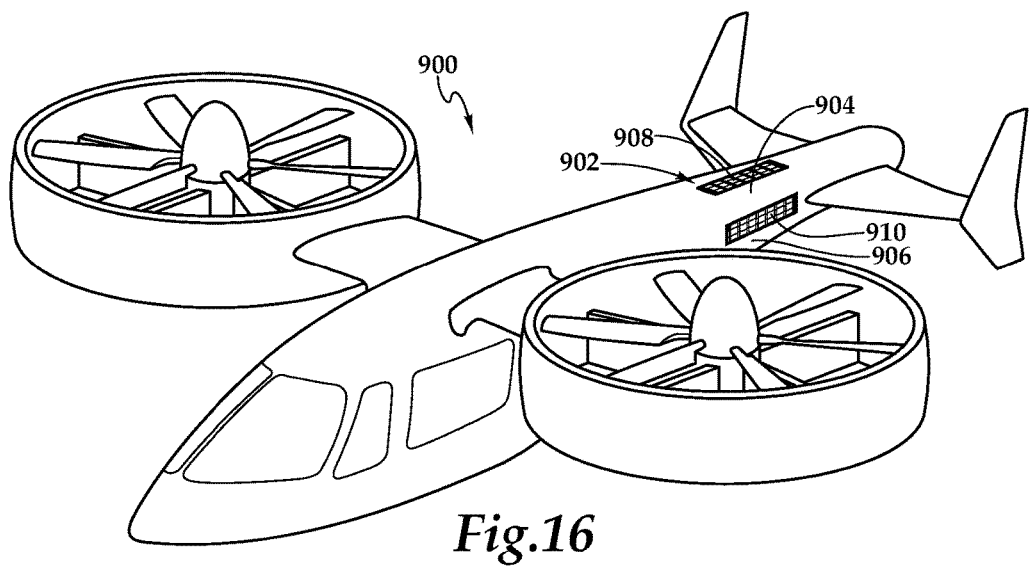
FIG. 16 is an isometric view of a tilting ducted fan aircraft utilizing a variable thrust cross-flow fan system in accordance with embodiments of the present disclosure.

Referring to FIG. 16 in the drawings, a tilting ducted fan aircraft utilizing a variable thrust cross-flow fan assembly to control both pitch and yaw is schematically illustrated and generally designated 900. Variable thrust cross-flow fan system 902, located at aft station 904 of tailboom 906, generates thrusts in the upward, downward, leftward and/or rightward directions by allowing for the movement of the control cam in both the vertical and horizontal directions. Thus, not only may pitch be controlled during vertical takeoff and landing mode, but yaw may also be controlled during such operational modes as well as forward flight mode. In these embodiments, a housing, analogous to housing 500 in FIG. 12, may include four housing ducts: a top housing duct 908, a left housing duct 910, a bottom housing duct (not shown) and a right housing duct (not shown). In other embodiments, the housing employed for variable thrust cross-flow fan system 902 may include two housing ducts as in housing 500 in FIG. 12, except that the housing may be rotatable between a vertical and horizontal orientation. While in the vertical orientation, the housing may allow thrusts in the upward and downward directions to control pitch. While in the horizontal orientation, the housing may allow thrusts in the left and right directions to control yaw. The rotation of the housing may be controlled by input from a pilot or from elsewhere.

Figure 17:
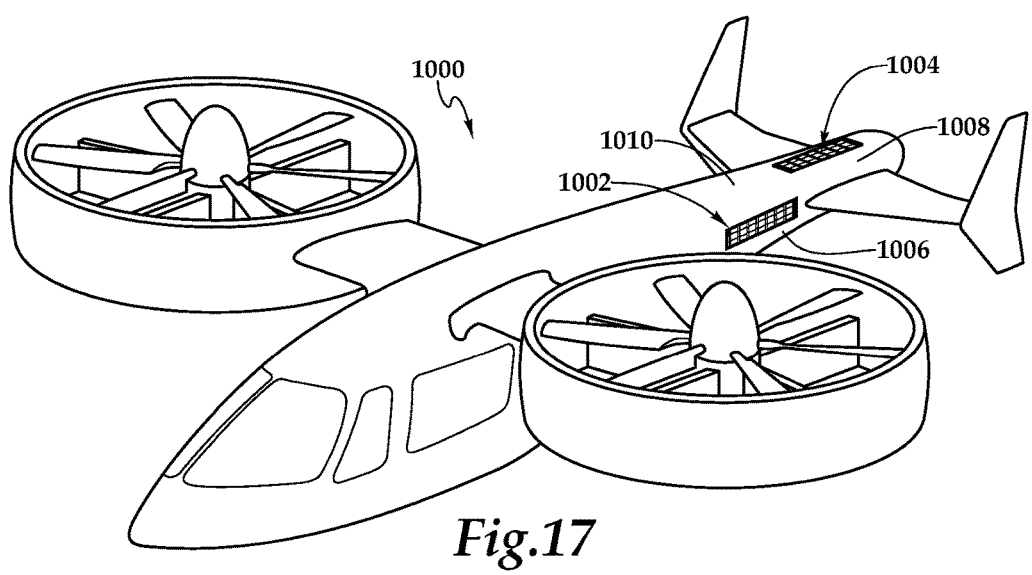
FIG. 17 is an isometric view of a tilting ducted fan aircraft utilizing two variable thrust cross-flow fan systems in accordance with embodiments of the present disclosure.

Referring to FIG. 17 in the drawings, a tilting ducted fan aircraft utilizing two variable thrust cross-flow fan systems is schematically illustrated and generally designated 1000. Aircraft 1000 includes two variable thrust cross-flow fan systems 1002, 1004 located at aft stations 1006, 1008 of tailboom 1010, respectively. Aft station 1008 is aft of aft station 1006. Variable thrust cross-flow fan system 1002, located forward of variable thrust cross-flow fan system 1004, generates a yaw control moment, which, in the illustrated embodiment, is a reversible horizontal yaw control thrust in the leftward or rightward directions to control the yaw of aircraft 1000 during forward flight mode and vertical takeoff and landing mode. Aircraft 1000 also includes variable thrust cross-flow fan system 1004, which generates a reversible vertical pitch control thrust in the upward or downward directions to generate a pitch control moment, thereby controlling the pitch of aircraft 1000 in the various operational modes of aircraft 1000. In some embodiments, both variable thrust cross-flow fan systems 1002, 1004 may be driven by a single driveshaft extending through tailboom 1010 and rotating at a substantially constant speed. Each variable thrust cross-flow fan system 1002, 1004 may also include a two-way housing, analogous to housing 500 in FIG. 12, with housing ducts that extend either horizontally or vertically, respectively.

Figure 18:
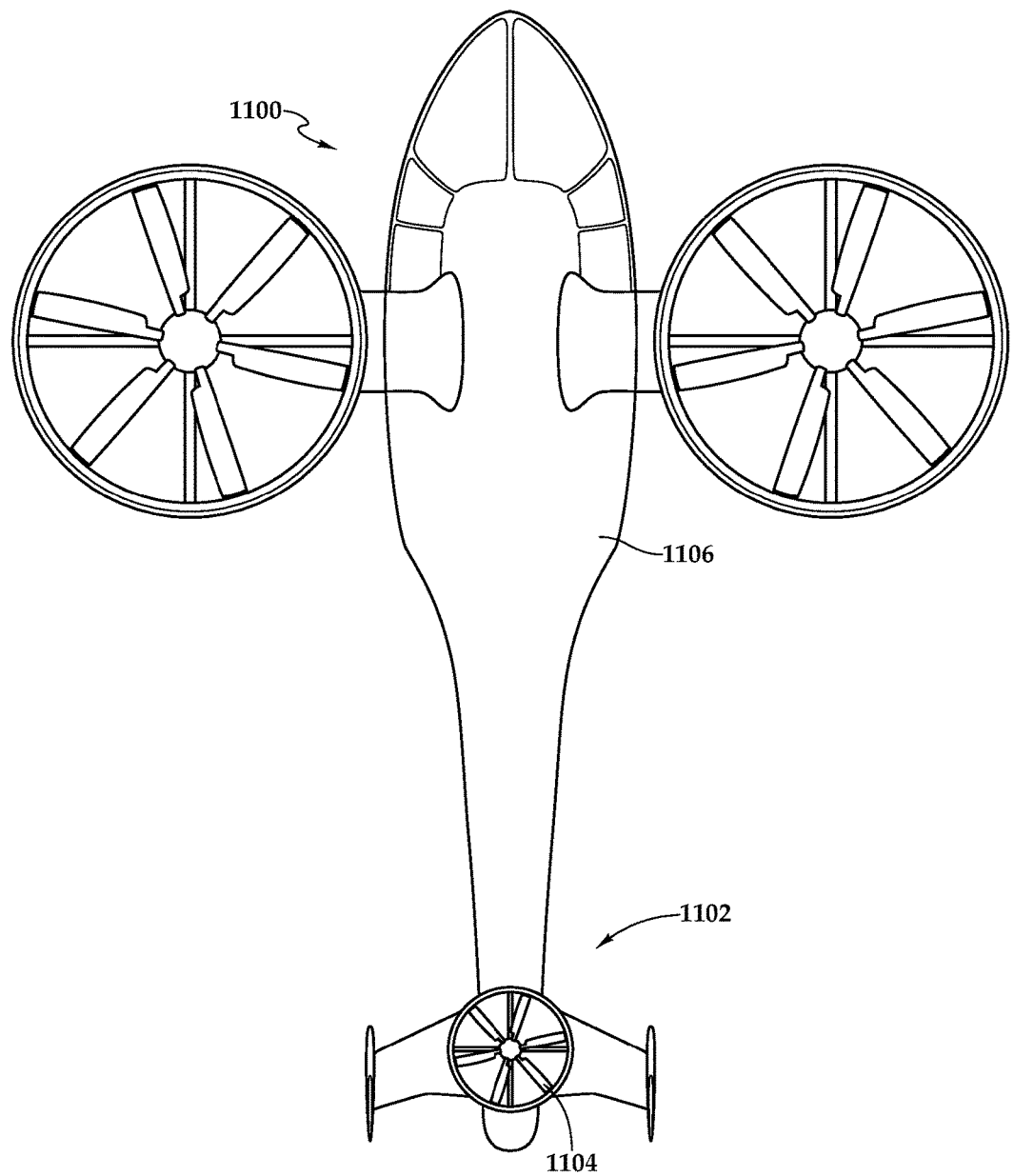
FIG. 18 is a top view of a tilting ducted fan aircraft utilizing a tail ducted fan in accordance with embodiments of the present disclosure.

Referring to FIG. 18 in the drawings, a tilting ducted fan aircraft is schematically illustrated and generally designated 1100. Aircraft 1100 includes a tail ducted fan 1102 that, in these embodiments, replaces the variable thrust cross-flow fan system. Tail ducted fan 1102, in some embodiments, may generate a reversible thrust by changing the collective pitch of blade assemblies 1104. The thrust generated by tail ducted fan 1102 may be in the upward or downward directions to control the pitch of aircraft 1100. In other embodiments, tail ducted fan 1102 may be rotatable about a longitudinal axis through the center of fuselage 1106 such that tail ducted fan 1102 may emit reversible thrusts in all radial directions emanating from such longitudinal axis, thereby enabling tail ducted fan 1102 to control the yaw and pitch of aircraft 1100 using a wide range of thrust vectors.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft comprising:
   a fuselage having a forward portion and an aft portion;
   first and second ducted fans supported by the forward portion of the fuselage and tiltable relative to the fuselage between a substantially horizontal orientation in a vertical takeoff and landing mode and a substantially vertical orientation in a forward flight mode;
   a tailboom extending from the aft portion of the fuselage and having an aft station; and
   a variable thrust cross-flow fan system disposed in the aft station of the tailboom operable to generate a pitch control moment, the variable thrust cross-flow fan system comprising:

a cross-flow fan assembly having a longitudinal axis and including first and second driver plates having a plurality of blades rotatably mounted therebetween, the plurality of blades disposed radially outwardly from the longitudinal axis such that the plurality of blades have a substantially circular path of travel when the cross-flow fan assembly rotates about the longitudinal axis, the plurality of blades moveable between a plurality of pitch angle configurations; and
a control assembly coupled to the plurality of blades, the control assembly including a control cam operable to translate relative to the cross-flow fan assembly to change the pitch angle configuration of the plurality of blades;
wherein, the cross-flow fan assembly is operable to produce a thrust in one of a first or second direction in response to the control cam translating upward relative to the cross-flow fan assembly and is further operable to produce a thrust in the other of the first or second direction in response to the control cam translating downward relative to the cross-flow fan assembly, the first direction opposite from the second direction.

2. The aircraft as recited in claim 1 wherein the pitch control moment further comprises pitch control thrust generated by the variable thrust cross-flow fan system.

3. The aircraft as recited in claim 1 wherein the pitch control moment further comprises variable pitch control thrust generated by the variable thrust cross-flow fan system.

4. The aircraft as recited in claim 1 wherein the pitch control moment further comprises reversible pitch control thrust generated by the variable thrust cross-flow fan system.

5. The aircraft as recited in claim 1 wherein the pitch control moment is operable to maintain the aircraft in a substantially horizontal attitude during hover.

6. The aircraft as recited in claim 1 wherein the pitch control moment is operable to maintain the aircraft in a substantially horizontal attitude during transitions between the vertical takeoff and landing mode and the forward flight mode.

7. The aircraft as recited in claim 1 wherein the plurality of pitch angle configurations includes at least one upward thrust configuration, a neutral configuration and at least one downward thrust configuration.

8. The aircraft as recited in claim 1 wherein the control cam is operable to rotate with the cross-flow fan assembly.

9. The aircraft as recited in claim 1 wherein the control cam is non-rotatable relative to the cross-flow fan assembly.

10. The aircraft as recited in claim 1 wherein, in vertical takeoff and landing mode, yaw is controllable responsive to thrust vectoring the first and second ducted fans.

11. The aircraft as recited in claim 1 wherein, in vertical takeoff and landing mode, roll is controllable responsive to independently adjusting collective pitch of the first and second ducted fans.

12. The aircraft as recited in claim 1 wherein, in forward flight mode, yaw is controllable responsive to independently adjusting collective pitch of the first and second ducted fans.

13. An aircraft comprising:
a fuselage having a forward portion and an aft portion;
first and second ducted fans supported by the forward portion of the fuselage and tiltable relative to the fuselage between a substantially horizontal orientation in a vertical takeoff and landing mode and a substantially vertical orientation in a forward flight mode;
a tailboom extending from the aft portion of the fuselage and having first and second aft stations;
a first variable thrust cross-flow fan system disposed in the first aft station of the tailboom operable to generate a pitch control moment; and
a second variable thrust cross-flow fan system disposed in the second aft station of the tailboom operable to generate a yaw control moment, the first and second variable thrust cross-flow fan systems each comprising:
a cross-flow fan assembly having a longitudinal axis and including first and second driver plates having a plurality of blades rotatably mounted therebetween, the plurality of blades disposed radially outwardly from the longitudinal axis such that the plurality of blades have a substantially circular path of travel when the cross-flow fan assembly rotates about the longitudinal axis, the plurality of blades moveable between a plurality of pitch angle configurations; and
a control assembly coupled to the plurality of blades, the control assembly including a control cam operable to translate relative to the cross-flow fan assembly to change the pitch angle configuration of the plurality of blades;
wherein, the cross-flow fan assembly of the first variable thrust cross-flow fan system is operable to produce a thrust in one of an upward or downward direction in response to the control cam translating upward relative to the cross-flow fan assembly and is further operable to produce a thrust in the other of the upward or downward direction in response to the control cam translating downward relative to the cross-flow fan assembly; and
wherein, the cross-flow fan assembly of the second variable thrust cross-flow fan system is operable to produce a thrust in one of a leftward or rightward direction in response to the control cam translating leftward relative to the cross-flow fan assembly and is further operable to produce a thrust in the other of the leftward or rightward direction in response to the control cam translating rightward relative to the cross-flow fan assembly.

14. The aircraft as recited in claim 13 wherein the first aft station is aft of the second aft station.

15. The aircraft as recited in claim 13 wherein the pitch control moment further comprises a reversible pitch control thrust generated by the first variable thrust cross-flow fan system and wherein the yaw control moment further comprises a reversible yaw control thrust generated by the second variable thrust cross-flow fan system.

16. The aircraft as recited in claim 1 further comprising:
an actuator assembly operably coupled to the control cam, the actuator assembly operable to translate the control cam relative to the cross-flow fan assembly to change the pitch angle configuration of the plurality of blades to generate variable thrust.

17. The aircraft as recited in claim 1 wherein the cross-flow fan assembly is operable to rotate at a substantially constant rotational speed.

18. The aircraft as recited in claim 1 wherein the control cam forms one or more follower slots.

19. The aircraft as recited in claim 18 wherein the one or more follower slots further comprise one or more concentric follower slots.

* * * * *